United States Patent
Kuch et al.

(10) Patent No.: US 7,496,909 B2
(45) Date of Patent: *Feb. 24, 2009

(54) PROFILE-DRIVEN DATA LAYOUT OPTIMIZATION

(75) Inventors: Gerald Dwayne Kuch, Seattle, WA (US); Jason L. Zander, Redmond, WA (US); Brian C. Beckman, New Castle, WA (US)

(73) Assignee: Microsoft Corporation, Redmond, WA (US)

( * ) Notice: Subject to any disclaimer, the term of this patent is extended or adjusted under 35 U.S.C. 154(b) by 4 days.

This patent is subject to a terminal disclaimer.

(21) Appl. No.: 11/069,232

(22) Filed: Feb. 28, 2005

(65) Prior Publication Data

US 2005/0177822 A1 Aug. 11, 2005

Related U.S. Application Data

(63) Continuation of application No. 09/542,525, filed on Apr. 4, 2000, now Pat. No. 6,862,729.

(51) Int. Cl.
*G06F 9/45* (2006.01)
*G06F 12/00* (2006.01)

(52) U.S. Cl. .................. 717/158; 717/151; 711/165
(58) Field of Classification Search ............... 717/158, 717/151; 711/165
See application file for complete search history.

(56) References Cited

U.S. PATENT DOCUMENTS 5,075,848 A 12/1991 Lai et al.
5,579,520 A 11/1996 Bennett
5,752,038 A 5/1998 Blake et al.
5,790,858 A 8/1998 Vogel (Continued)

FOREIGN PATENT DOCUMENTS

EP 0 755 003 A 1/1997

OTHER PUBLICATIONS

Chilimbi, et al. "Using Generational Garbage Collection To Implement Cache-Conscious Data Placement", 1998, ACM, p. 37-48.*

(Continued)

*Primary Examiner*—Wei Y Zhen
*Assistant Examiner*—Qamrun Nahar
(74) *Attorney, Agent, or Firm*—Klarquist Sparkman, LLP

(57) ABSTRACT

Data layout optimization arranges data members within memory to enhance software performance. Profiling data is consulted to determine how to group data members for an object class into groups. One technique groups the data members based on how frequently the data members are referenced in memory. Another technique groups the data members based on their affinities for one another in time as determined by observing when references to the data members take place. A variety of options when collecting the profiling data and grouping the data members is supported. The data member grouping is recorded in metadata associated with a definition of the object class. At runtime, a class loader places the data members of an object in memory according to the metadata. Data members of different groups can be placed in separately-loadable units of memory in the memory system. Subsequently, when the data members are referenced in memory, more frequently referenced data members, including those that tend to be referenced at times close to each other, reside at neighboring locations in the memory system.

6 Claims, 16 Drawing Sheets

U.S. PATENT DOCUMENTS

| | | | |
|---|---|---|---|
| 5,790,865 | A | 8/1998 | Smaalders et al. |
| 5,884,316 | A | 3/1999 | Bernstein et al. |
| 6,059,838 | A | 5/2000 | Fraley et al. |
| 6,189,141 | B1* | 2/2001 | Benitez et al. ............... 717/153 |
| 6,230,312 | B1 | 5/2001 | Hunt |
| 6,263,491 | B1 | 7/2001 | Hunt |
| 6,269,477 | B1 | 7/2001 | Fitzgerald et al. |
| 6,321,240 | B1 | 11/2001 | Chilimbi et al. |
| 6,324,620 | B1* | 11/2001 | Christenson et al. ........ 711/112 |
| 6,381,628 | B1 | 4/2002 | Hunt |
| 6,381,735 | B1 | 4/2002 | Hunt |
| 6,381,739 | B1 | 4/2002 | Breternitz et al. |
| 6,381,740 | B1 | 4/2002 | Miller et al. |
| 6,401,097 | B1 | 6/2002 | McCotter et al. |
| 6,499,137 | B1 | 12/2002 | Hunt |
| 6,546,553 | B1 | 4/2003 | Hunt |
| 6,594,678 | B1 | 7/2003 | Stoutamire et al. |
| 6,629,123 | B1 | 9/2003 | Hunt |
| 6,631,496 | B1* | 10/2003 | Li et al. ................... 715/501.1 |
| 6,651,243 | B1 | 11/2003 | Berry et al. |
| 6,681,387 | B1 | 1/2004 | Hwu et al. |
| 6,862,729 | B1* | 3/2005 | Kuch et al. ................. 717/158 |
| 6,983,463 | B1 | 1/2006 | Hunt |
| 7,013,459 | B2* | 3/2006 | Kuch et al. ................. 717/158 |
| 7,039,919 | B1 | 5/2006 | Hunt |

OTHER PUBLICATIONS

U.S. Appl. No. 08/931,861, filed Sep. 16, 1997, Douceur et al.

Norman and Fitch, "Memory Tracing of Algebraic Calculations," *Proceedings of the 1996 International Symposium on Symbolic and Algebraic Computation*, pp. 113-119, 1996.

Xia and Torrellas, "Instruction Prefetching of Systems Codes With Layout Optimized for Reduced Cache Misses," *Proceedings of the 23rd Annual International Symposium on Computer Architecture*, pp. 271-282, 1996.

Tomiyama and Yasuura, "Code Placement Techniques for Cache Miss Rate Reduction," *ACM Trans. Des. Autom. Electron. Syst.* 2, 4:410-429, Oct. 1997.

Brewer, "High-Level Optimization Via Automated Statistical Modeling," *Proceedings of the Fifth ACM SIGPLAN Symposium on Principles & Practice of Parallel Programming*, pp. 80-91, 1995.

"Basic Techniques for Design and Analysis of Algorithms," *The Computer Science and Engineering Handbook*, Tucker (ed.), CRC Press, pp. 64-85, 1997.

"Graph and Network Algorithms," *The Computer Science and Engineering Handbook*, Tucker (ed.), CRC Press, pp. 203-225, 1997.

Burger et al., "Memory Systems," *The Computer Science and Engineering Handbook*, Tucker (ed.), CRC Press, pp. 447-461, 1997.

Denning, "Virtual Memory," *The Computer Science and Engineering Handbook*, Tucker (ed.), CRC Press, pp. 1747-1760, 1997.

Reiss, "Software Tools and Environments," *The Computer Science and Engineering Handbook*, Tucker (ed.), CRC Press, pp. 2419-2439, 1997.

Gloy et al., "Procedure Placement Using Temporal Ordering Information," *IEEE*, pp. 303-313, 1997.

"Memory Management," *Microsoft Win32 Programmer's Reference*, vol. 2, System Services, Multimedia, Extensions, and Application Notes, Microsoft Press, pp. 3-16, 1993.

Baker, Jr. et al., "Optimizing Allocation and Garbage Collection of Spaces," http://linux.rice.edu/~rahul/hbaker/OptAlloc.html, pp. 1-4, 1979.

"BIBOP (also known as big bag of pages)," p. 1, Dec. 20, 2000.

Luk et al., "Memory Forwarding: Enabling Aggressive Layout Optimizations by Guaranteeing the Safety of Data Relocation," *IEEE Proceedings, 26th Annual International Symposium on Computer Architecture*, pp. 88-99, May 1999.

Hanson, "A Portable Storage Management System for the Icon Programming Language," *Software-Practice and Experience*, vol. 10, pp. 489-500, 1980.

Baier, "Dynamic Improvement of Locality in Virtual Memory Systems," *IEEE Transactions on Software Engineering*, vol. SE-2, No. 1, pp. 54-62, Mar. 1976.

Kistler et al., "The Case for Dynamic Optimization," Department of Information and Computer Science, pp. 1-21, May 12, 1999.

Kistler et al., "Computing the Similarity of Profiling Data," *Proceedings of the Workshop on Profile and Feedback-Directed Compilation*, Paris, France, pp. 1-6, Sep. 1998.

"Big bag of pages," http://wombat.doc.ic.ac.uk/foldoc/foldoc.cgi?Big+bag+of+pages, p. 1, Mar. 3, 2000.

Seidl et al., "Segregating Heap Objects by Reference Behavior and Lifetime," *Proceeding of the Eighth International Conference on Architectural Support for Programming Languages and Operating Systems*: 1-12, Oct. 1998.

Kistler et al., "Automated Layout of Data Members for Type-Safe Languages," *Technical Report (Revised Version)-University of California-Department of Information and Computer Science*: 1-10, Sep. 1998, URL:http://caesar.ics.uci.edu/kistler/papers/ics-tr-98-22-R.pdf.

Franz et al., "Splitting Data Objects to Increase Cache Utilization," *Technical Report- University of California-Department of Information and Computer Science*, No. 98-34: 1-11, Oct. 1998, URL:http://www.ics.uci.edu/z/pubs-pdf/ICS-TR-98-34.pdf.

Babonneau et al., "Automatic and general solution to the adaptation of programs in a paging environment," *Proceedings of the Sixth Symposium on Operating Systems Principles*, West Lafayette, In, vol. 11, No. 5: 109-116, Nov. 16-18, 1977.

Gosling et al., "The Java Language Environment. A White Paper," *Sun Delivers Java Workshop*: 1, 4-85, Oct. 1, 1995.

Δ T.M. Chilimbi and J.R. Larus, "Using Generational Garbage Collection To Implement Cache-Conscious Data Placement", 1998, ACM, p. 37-48.

Δ B. Calder, C. Krintz, S. John, T. Austin, "Cache-Conscious Data Placement", 1998, ACM, p. 139-149.

Δ S. Carr, K. S. McKinley, C-W Tseng, "Compiler Optimizations for Improving Data Locality", 1994, ACM, p. 252-262.

Δ C-K Luk, T. C. Mowry, "Memory Forwarding: Enabling Aggressive Layout Optimizations by Guaranteeing the Safety of Data Relocation", 1999, IEEE, p. 88-99.

Chilimbi et al., "Cache-Conscious Structure Definition," *Proceedings of the ACM SIGPLAN '99 Conference on Programming Language Design and Implementation (PLDI) SigPlan Notices*, pp. 13-24, May 1999.

* cited by examiner

FIG. 9

```
void SaveHitCountsAndPossiblyFlushRecord ()
{
// H = hits so far (overall count)
//H1 = previous value of H
// L = Hits observed during last segment
//         (e.g., method execution)
  if ((H + L) < H)  // overflow this time
    FlushRecord () ;
  else
  { H+=L ;  //bump overall count by current counts
    L = 0 ;
    // will we overflow next time? (linear forecast)
    if ( ((H - H1) + H) < H)
      FlushRecord ();
    else
      H1 = H ; // remember current count
  }
} void FlushRecord ()
{ Write (H, fieldName, className) ;
  H1 = 0 ; // zero out the previous count
  H = L;
  L = 0 ;
}
```

PROFILE-DRIVEN DATA LAYOUT OPTIMIZATION

CROSS-REFERENCE TO PRIOR APPLICATIONS

This application is a continuation of U.S. patent application Ser. No. 09/542,525, filed Apr. 4, 2000, entitled "PROFILE-DRIVEN DATA LAYOUT OPTIMIZATION," by inventors Gerald Dwayne Kuch et al., which application is hereby incorporated herein by reference.

TECHNICAL FIELD

The field relates to optimization of computer software, and more particularly relates to determining data layout based on data obtained by profiling the software.

BACKGROUND

Various techniques have evolved for improving the performance of computer software. A category of techniques commonly called "optimization" evaluates a piece of software and modifies its operation to improve performance while preserving the software's functionality.

For example, the architecture of many computer systems organizes memory into pages. Such systems may include a mechanism by which a limited number of pages can be loaded into primary memory for access by a processor. Additional pages can be stored in secondary memory; however, when the system accesses secondary memory, processing is suspended while moving the pages from secondary memory to primary memory.

For purposes of illustration, consider a piece of software having instructions for four procedures A, B, C, and D executing in sequence in a system having only one page of primary memory. If procedures, A and C are on a first page, and procedures B and D are on a second page, the following eight actions take place when the piece of software is executed:

1. Move first page to primary memory
2. Execute procedure A
3. Move second page to primary memory
4. Execute procedure B
5. Move first page to primary memory
6. Execute procedure C
7. Move second page to primary memory
8. Execute procedure D.

One optimization technique places code portions which execute within a certain period of time in close proximity to each other. Thus, A and B are placed close to each other (e.g., on the same page) and C and D are place close to each other. Applying such optimization to the above piece of software, the following six actions take place when the piece of software is executed:

1. Move first page to primary memory
2. Execute procedure A
3. Execute procedure B
4. Move first page to primary memory
5. Execute procedure C
6. Execute procedure D.

Thus, optimization of the software has saved two actions. Since moving pages into primary memory typically requires a large amount of time in terms of processing cycles, the savings is significant. This optimization technique can be applied to large software projects to provide dramatic savings in processing resources.

Although manual optimization is possible, software developers employ a technique called profiling to automate the process. Profiling observes software's behavior during execution to assist in optimization. For example, information about which procedures are executed within a certain period of time can be collected for the above-described optimization technique.

SUMMARY

While the above-described techniques can lead to significant improvements in software performance, they focus on the code-related portions of software and fail to recognize inefficiencies related to the data-related portions of software. These techniques further fail to take into account various peculiarities of object-oriented software.

The invention includes a method and system for data layout optimization based on profiling. Various features provided by the system lead to better use of resources and improved performance. For example, data members of a software object can be divided into separate groups. Further, the system can provide feedback to assist in re-designing software object classes.

In one feature, data members of an object can be split into plural separate groups. For example, some data members of an object class can be designated as residing in a hot group, while others reside in a cold group. At runtime, the groups can be placed in separately-loadable units of a memory system. Data members from the same group can be placed at neighboring locations in the memory system. From the perspective of functions within the software, the division of the data members is inconsequential, but software performance can be improved.

In another feature, metadata describing the groups can be associated with an object class for consideration when the data members of an object are arranged in a memory system when the object is loaded into memory. In this way, the fields of an object can be stored in appropriate locations in the memory system, according to previously observed behavior of the software. For example, more frequently referenced data members can be placed at neighboring locations, and less frequently referenced data members can be placed at other locations separately loadable into the memory system.

In yet another feature, calculations for determining layout of data include the time domain to determine affinity of data members of one another with respect to time. Thus, "affinity" in such an arrangement means affinity in time. Analysis of the observation of software's behavior can determine that certain data members tend to be referenced at times close to each other. As a result of making such a determination, the data members can be placed close to each other in the memory system. Affinity-based layout can produce better results under certain circumstances.

In still another feature, a software developer can declaratively control optimization by including certain statements in source code or specifying options at a command line. For example, a programmer may wish to explicitly specify a particular layout scheme.

Another feature provides affinity information visually for consideration by developers. The information may lead to a re-design of the object classes to build a high-performance software object set.

Various aspects of the invention thus improve upon the above-described optimization technique, which focuses on optimizing the arrangement of data members of an object. The problem referred to as "dragging around dead data" is avoided. Performance is increased dramatically under certain circumstances, such as when some data members are quite frequently referenced, while others are referenced only a few times, once, or not at all.

Additional features and advantages of the invention will be made apparent from the following detailed description of illustrated embodiments, which proceeds with reference to the accompanying drawings.

BRIEF DESCRIPTION OF THE DRAWINGS

FIG. 9 is a source code listing of a method for tracking the likelihood of a counter overflow during collection of profile data.

DETAILED DESCRIPTION

The invention is directed toward a method and system for laying out data members of software objects. In one embodiment illustrated herein, the invention is incorporated into a runtime environment associated with the "COM+" component of an operating system entitled "MICROSOFT WINDOWS 2000," both marketed by Microsoft Corporation of Redmond, Wash. Briefly described, this software is a scaleable, high-performance network and computer operating system providing an object execution environment for object programs conforming to COM and other specifications. COM+ also supports distributed client/server computing. The COM+ component incorporates new technology as well as object services from prior object systems, including the MICROSOFT Component Object Model (COM), the MICROSOFT Distributed Component Object Model (DCOM), and the MICROSOFT Transaction Server (MTS).

Exemplary Operating Environment

Figure 1:
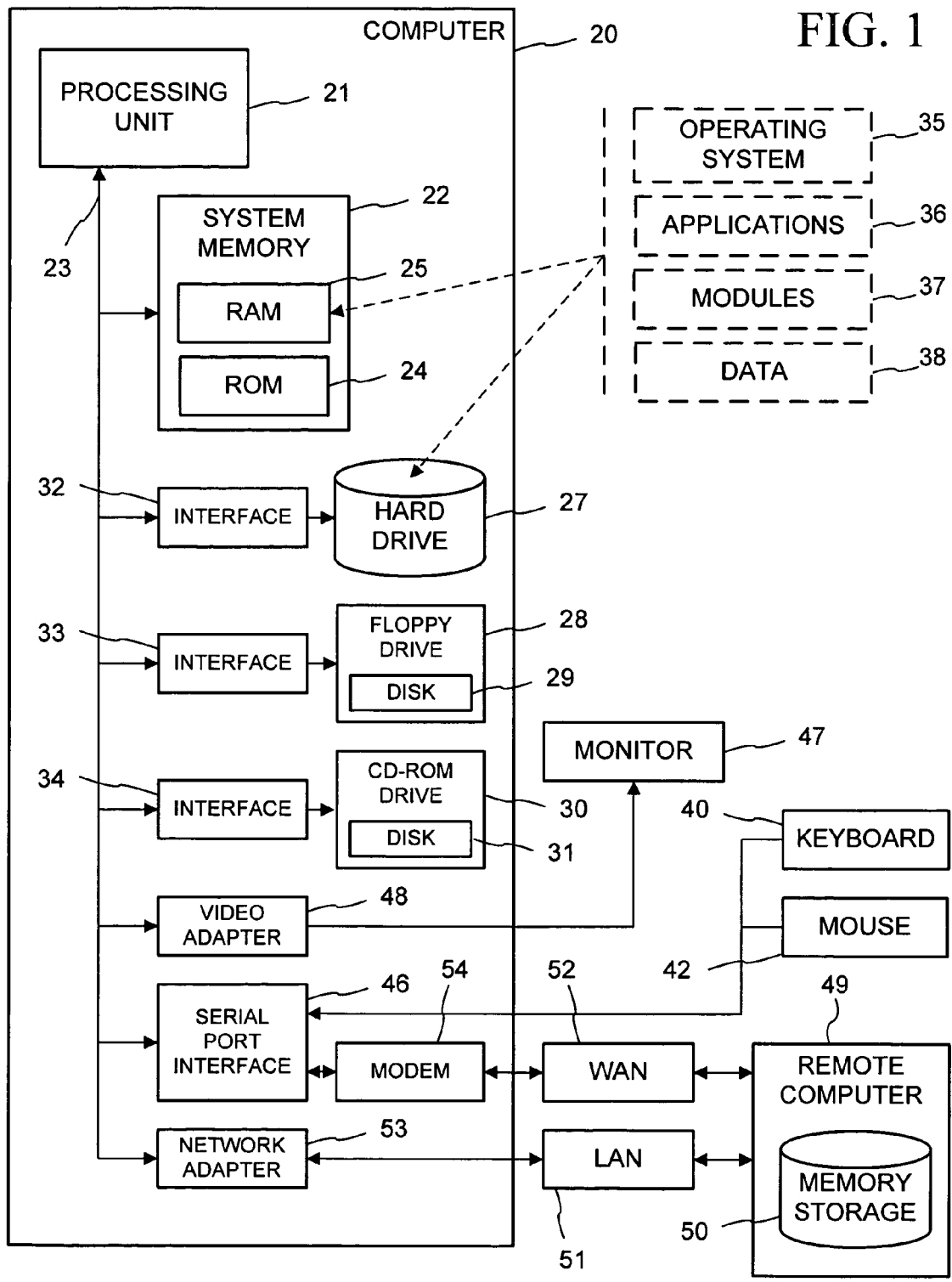
FIG. 1 is a block diagram of a computer system that may be used to implement the described optimization system.

FIG. 1 and the following discussion are intended to provide a brief, general description of a suitable computing environment in which the invention may be implemented. While the invention will be described in the general context of computer-executable instructions of a computer program that runs on a computer, the invention also may be implemented in combination with other programs. Generally, programs include routines, software objects (also called components), data structures, etc. that perform particular tasks or implement particular abstract data types. Moreover, the invention may be practiced with other computer system configurations, including single- or multiprocessor computer systems, minicomputers, mainframe computers, as well as personal computers, hand-held computing devices, microprocessor-based or programmable consumer electronics, and the like. The illustrated embodiment of the invention also is practiced in distributed computing environments where tasks are performed by remote processing devices that are linked through a communications network. But, some embodiments of the invention can be practiced on stand-alone computers. In a distributed computing environment, program modules may be located in both local and remote memory storage devices.

With reference to FIG. 1, an exemplary system for implementing the invention includes a conventional computer 20, including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 24 and random access memory (RAM) 25. A basic input/output system (BIOS), containing the basic routines that help to transfer information between elements within the computer 20, such as during start-up, is stored in ROM 24.

The computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of programs may be stored in the drives and RAM 25, including an operating system 35, one or more application programs 36, other programs 37, and program data 38. The operating system 35 in the illustrated computer may be the MICROSOFT WINDOWS NT Server operating system, together with the before mentioned MICROSOFT Transaction Server.

A user may enter commands and information into the computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as a remote client computer 49. The remote computer 49 may be a workstation, a terminal computer, another server computer, a router, a peer device or other common network node, and typically includes many or all of the elements described relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, extranets, and the Internet.

When used in a LAN networking environment, the computer 20 is connected to the local network 51 through a network interface or adapter 53. When used in a WAN networking environment, the computer 20 typically includes a modem 54, or is connected to a communications server on the LAN, or has other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Object Overview

Figure 2:
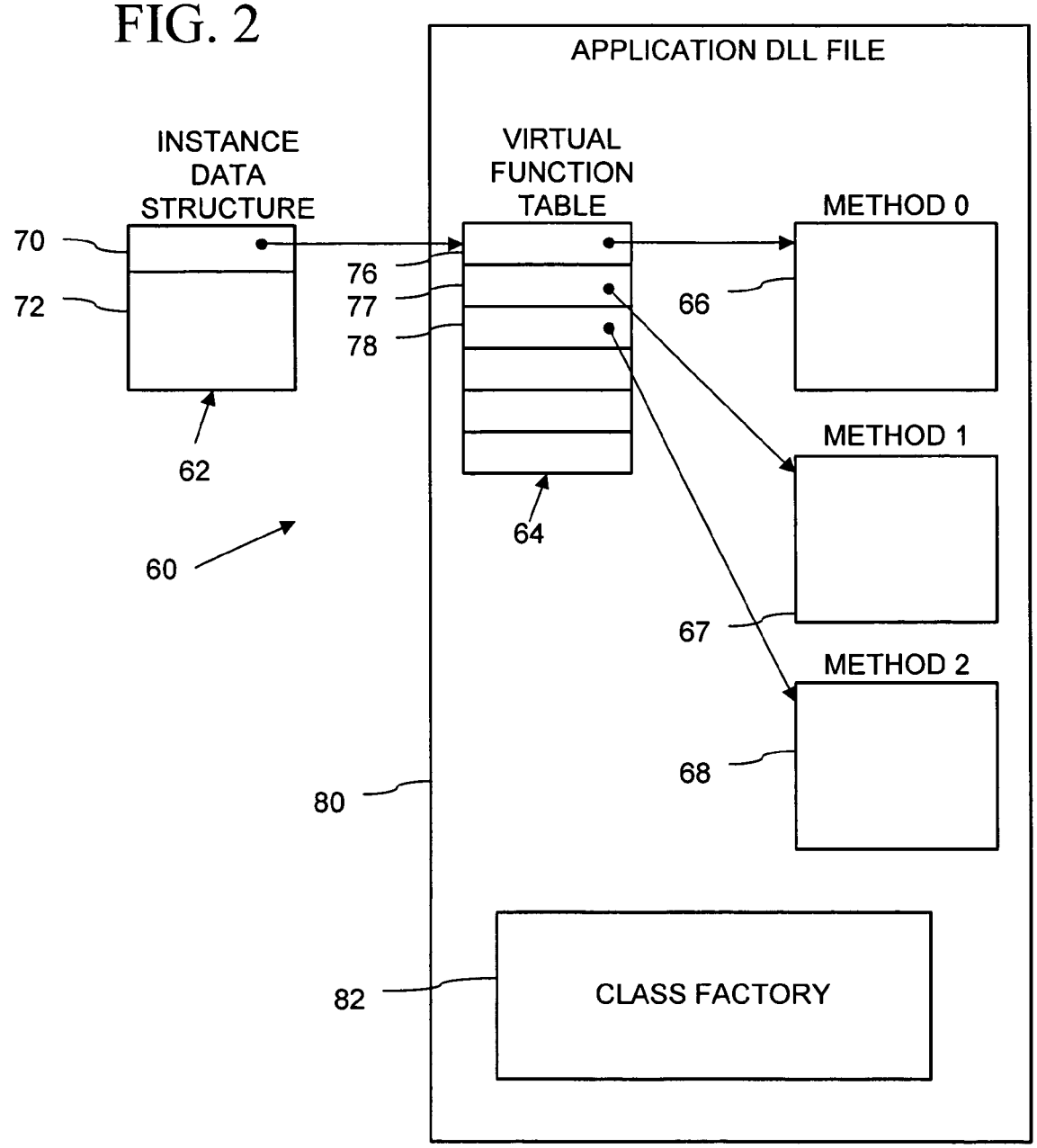
FIG. 2 is a block diagram of an object conforming to the Component Object Model specification of Microsoft Corporation, which may be used for objects to be optimized according to the invention.

FIG. 2 and the following discussion are intended to provide an overview of software objects, using the MICROSOFT Component Object Model (COM) as an exemplary object model. In the illustrated embodiments, a software management framework is implemented in an extension to the MICROSOFT COM Environment termed "COM+." COM is a model for accommodating software objects and can be implemented on a variety of platforms, such as the MICROSOFT WINDOWS NT operating system. In the illustrated embodiments of the invention, the software objects conform to the MICROSOFT Component Object Model ("COM") specification (i.e., are implemented as a "COM Object" 76) and are executed using the COM+ services of the MICROSOFT WINDOWS 2000 operating system, but alternatively may be implemented according to other object standards (including the CORBA (Common Object Request Broker Architecture) specification of the Object Management Group and JAVABEANS by Sun Microsystems) and executed under object services of another operating system. The COM specification defines binary standards for objects and their interfaces which facilitate the integration of software objects into programs. (For a detailed discussion of COM and OLE, see Kraig Brockschmidt, *Inside OLE, Second Edition*, Microsoft Press, Redmond, Wash. (1995)).

In accordance with COM, the COM object 60 is represented in the computer system 20 (FIG. 1) by an instance data structure 62, a virtual function table 64, and member methods (also called member functions) 66-68. The instance data structure 62 contains a pointer 70 to the virtual function table 64 and data 72 (also referred to as data members, or properties of the object). A pointer is a data value that holds a reference to an item. As will be explained in greater detail below, the conventional instance data structure 70 is modified to accommodate grouping the data members into separate groups. The virtual function table 64 contains entries 76-78 for the member methods 66-68. Each of the entries 76-78 contains a reference to the code 66-68 that implements the corresponding member methods.

The pointer 70, the virtual function table 64, and the member methods 66-68 implement an interface of the COM object 60. By convention, the interfaces of a COM object are illustrated graphically as a plug-in jack as shown for the software object 1104 in FIG. 11. Also, interfaces conventionally are given names beginning with a capital "I." In accordance with COM, the COM object 60 can include multiple interfaces, which are implemented with one or more virtual function tables. The member function of an interface is denoted as "IInterfaceName::MethodName."

The virtual function table 64 and member methods 66-68 of the COM object 60 are provided by an object server program 80 (hereafter "object server DLL") which is stored in the computer 20 (FIG. 1) as a dynamic link library file (denoted with a ".dll" file name extension). In accordance with COM, the object server DLL 80 includes code for the virtual function table 64 and member methods 66-68 of the classes that it supports, and also includes a class factory 82 that generates the instance data structure 62 for an object of the class.

Other objects and programs (referred to as a "client" of the COM object 60) access the functionality of the COM object by invoking the member methods through the COM object's interfaces. Typically however, the COM object is first instantiated (i.e., by causing the class factory to create the instance data structure 62 of the object); and the client obtains an interface pointer to the COM object.

Before the COM object 60 can be instantiated, the object is first installed on the computer 20. Typically, installation involves installing a group of related objects called a package. The COM object 60 is installed by storing the object server DLL file(s) 80 that provides the object in data storage accessible by the computer 20 (typically the hard drive 27, shown in FIG. 1), and registering COM attributes (e.g., class identifier, path and name of the object server DLL file 80, etc.) of the COM object in one or more data stores storing configuration information. Configuration data stores for the object include the registry and the catalog.

A client requests instantiation of the COM object using system-provided services and a set of standard, system-defined component interfaces based on class and interface identifiers assigned to the COM Object's class and interfaces. More specifically, the services are available to client programs as application programming interface (API) functions provided in the COM+ library, which is a component of the MICROSOFT WINDOWS 2000 operating system in a file named "OLE32.DLL." Other versions of COM+ or other object services may use another file or another mechanism. Also in COM+, classes of COM objects are uniquely associated with class identifiers ("CLSIDs"), and registered by their CLSID in the registry (or the catalog, or both). The registry entry for a COM object class associates the CLSID of the class with information identifying an executable file that provides the class (e.g., a DLL file having a class factory to produce an instance of the class). Class identifiers are 128-bit globally unique identifiers ("GUIDs") that the programmer creates with a COM+ service named "CoCreateGUID" (or any of several other APIs and utilities that are used to create universally unique identifiers) and assigns to the respective classes. The interfaces of a component additionally are associated with interface identifiers ("IIDs").

In particular, the COM+ library provides an API function, "CoCreateInstance( )," that the client program can call to request creation of a component using its assigned CLSID and an IID of a desired interface. In response, the "CoCreateInstance( )" API looks up the registry entry of the requested CLSID in the registry to identify the executable file for the class. The "CoCreateInstance( )" API function then loads the class' executable file, and uses the class factory in the executable file to create an instance of the COM object 60. Finally, the "CoCreateInstance( )" API function returns a pointer of the requested interface to the client program. The "CoCreateInstance( )" API function can load the executable file either in the client program's process, or into a server process which can be either local or remote (i.e., on the same computer or a remote computer in a distributed computer network) depending on the attributes registered for the COM object 60 in the system registry.

Once the client of the COM object 60 has obtained this first interface pointer of the COM object, the client can obtain pointers of other desired interfaces of the component using the interface identifier associated with the desired interface. COM+ defines several standard interfaces generally supported by COM objects including the "IUnknown" interface. This interface includes a member function named "QueryInterface( )." The "QueryInterface( )" function can be called with an interface identifier as an argument, and returns a pointer to the interface associated with that interface identifier. The "IUnknown" interface of each COM object also includes member functions, "AddRef( )" and "Release( )", for maintaining a count of client programs holding a reference (e.g., an interface pointer) to the COM object. By convention, the "IUnknown" interface's member functions are included as part of each interface on a COM object. Thus, any interface pointer that the client obtains to an interface of the COM object 60 can be used to call the QueryInterface function.

Execution Engine Overview

Figure 3:
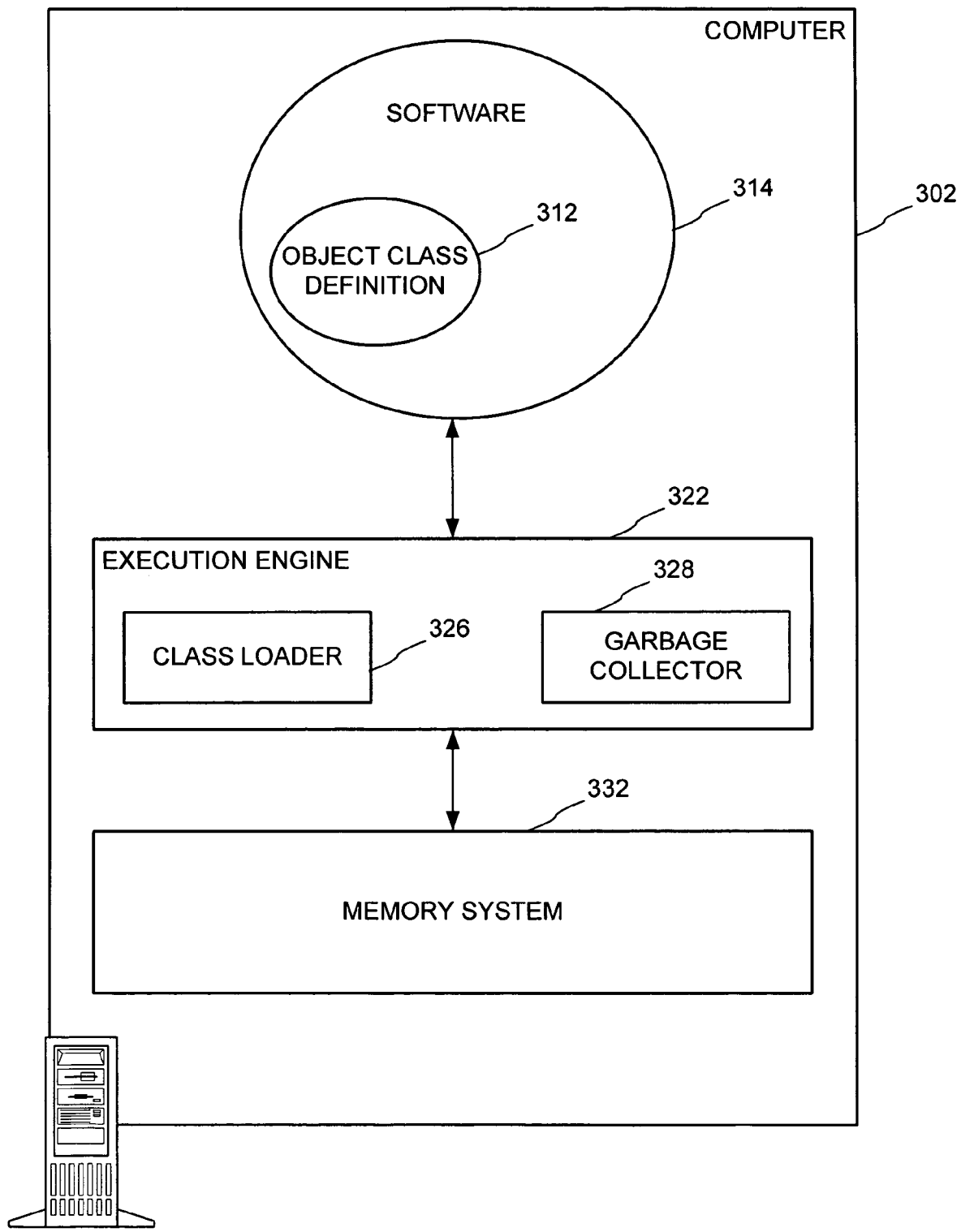
FIG. 3 is a block diagram showing an exemplary computer system including an execution engine.

For purposes of illustration, data layout optimization is shown implemented in an execution engine. An exemplary computer system 302 with an exemplary execution engine 322 is shown in FIG. 3. In the computer system 302, software 314 is provided by any of a number of means, such as by online or physical distribution. The software 314 includes one or more object class definitions 312. In some systems, information relating to the object class definitions 312 is stored in a central configuration store called a registry or catalog.

When the functionality provided by the software 314 is desired, the software is executed via the execution engine 322. The execution engine 322 is sometimes called a "virtual machine" because it provides processing services as if it were a computer system. The execution engine 322 typically offers more flexibility than an actual computer centered around a particular central processing unit. For instance, the execution engine 322 might process software in varying degrees of compilation (e.g., fully compiled, partially compiled, or uncompiled) in a variety of formats (e.g., in various languages or according to various native machine formats).

The execution engine 322 includes various components to perform its work. Typically, a class loader 326 and garbage collector 328 are included, although many other arrangements are possible. In the example, the class loader 326 performs the work of laying out objects of the class specified in the object class definition 312 in the memory system 332. For example, when a new object is created, the class loader 326 places an instance data structure (e.g., the instance data structure 62 shown in FIG. 2) at a particular location within the memory system 332. Further, the data members of an object (e.g., an integer field and an array) can be referenced in memory by referencing a particular address within the memory system 332. Preferably, the software 314 is written without regard to where in the memory system 332 the data members will be located. The execution engine 322 handles the details of determining where the data members will be located and how to access them within the memory system 332.

Although the memory system 332 is shown outside the execution engine 322, in some scenarios, it may be more accurate to portray the memory system 332 as part of the execution engine 322. In either case, the data members of an object are arranged within the memory system 332 in such a way that they can be referenced in memory for reading and writing by the software 314.

Memory System Overview

The principles of the invention can be applied to a wide variety of memory systems having architectures with at least two hierarchically-related portions of memory. These two portions of memory are sometimes referred to as a primary memory and a secondary memory.

Figure 4:
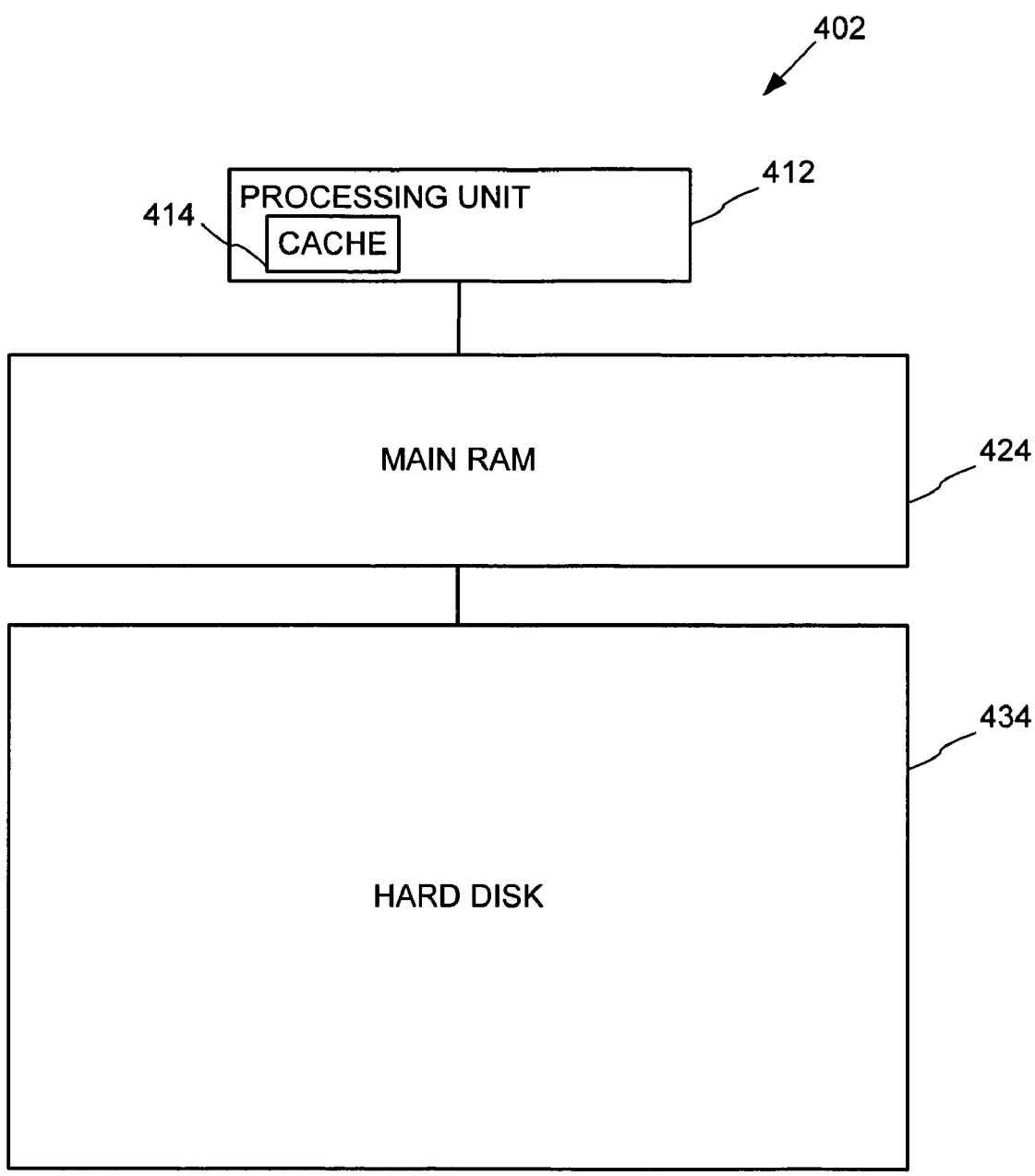
FIG. 4 is a block diagram showing an exemplary memory system.

For example, a virtual memory system 402 with an exemplary hierarchical memory architecture is illustrated in FIG. 4. In the example, a processing unit 412 has an associated cache 414, and the system 402 includes the main RAM 424 and the hard disk 434. For example, the main RAM 424 might take the form of 512 megabytes of RAM, and the hard disk 434 might be in the form of an 8 gigabyte hard disk. Many other arrangements and forms of storage are possible.

In accordance with accepted memory terminology the main RAM 424 is said to be "closer" to the processing unit and exhibits a lower latency (i.e., is faster) than the hard disk 434. Typically, elements of the memory system 402 closer to the processing unit 412 exhibit a lower latency but have less capacity than elements further away. Further, in a system having virtual memory, the processing unit 412 typically does not work directly on items on the hard disk 434, but instead first loads them into the main RAM 424.

In such a scenario, the main RAM 424 can be called the "primary" (or "main") memory, and the memory pages stored on the hard disk 434 can be called the "secondary" memory. Other arrangements are possible; the primary memory generally exhibits a lower latency than the secondary memory. In some systems, the cache 414 in combination with the main RAM 424 are considered to be part of the primary memory; in others, the cache 414 is not considered part of the virtual memory system 402, but is rather complementary to it. Further, there are often additional levels of cache within or in addition to the cache 414. Further details of virtual memory systems are discussed at length in Denning, "Virtual Memory," *Computer Science and Engineering Handbook* (Tucker, Ed.), Chapter 80, pp. 1747-1760, 1997.

In a virtual memory system, the memory system can, for example, use the hard disk 434 to supplement the main RAM 424. Thus, the virtual address space available to a program is much larger than the RAM available to the program. In this way, a computer system with a virtual memory system can run programs that will not fit in the main RAM 424 alone. Ideally, the virtual memory system 402 is transparent to the program, which simply provides a virtual memory address that refers to memory anywhere in the virtual memory system 402, whether it happens to reside in the main RAM 424 or on the hard disk 434.

The virtual memory is typically divided into units called "pages" (sometimes called "blocks"). The pages of a memory system can be either of a fixed or variable size. The contents of a program can be spread out over multiple pages. Typically, pages representing the program instructions and program data initially reside on the hard disk 434. As the program executes, the processing unit references data on these pages, so they are loaded into the main RAM 424. The set of pages in the main RAM 424 is sometimes called the "resident set". The virtual memory system 402 tracks which pages are available in the resident set. If an executing program specifies a virtual memory address referring to a page not in the resident set (i.e., not in main RAM 424), the virtual memory system responds by loading the page into the main RAM 424 for access by the processing unit.

As a program executes, a memory reference to a portion of memory present at a particular level in the hierarchy is called a "hit"; otherwise, it is a "miss." In the context of a cache, a cache hit means the item was present in cache when it was needed. If a memory reference is made to a virtual memory page not in primary memory, the miss is often referred to as a "page fault." Excessive page faults can particularly degrade performance because the processing unit typically suspends execution of the program until the page is fetched from a high-latency device (e.g., a mechanical device such as a hard disk).

Typically, the resident set for a program is limited to a certain number of pages, which may be less than the total pages required by the program. In other words, the entire program might not fit into the main RAM 424. Consequently, there will come a time when the processing unit requires access to a page, but the resident set has reached its limit. In such a situation, the virtual memory system 402 replaces a page in the resident set (i.e., in RAM 424) with a new page.

Various approaches sometimes called "replacement policies" have been formulated to determine which page should be replaced. For example, one approach replaces the least recently used page under the assumption that the least recently used page is least likely to be needed again soon. It would be inefficient, for example, to replace a page that is immediately reloaded back into the resident set.

Although a superior replacement policy can improve performance, performance improvement is bounded by how items are arranged within the pages (i.e., the layout of the items). The illustrated embodiments employ various techniques and features for determining an arrangement that results in better performance and further employ various techniques and features for achieving such an arrangement. The result is increased performance when a program is executed in an environment having primary and secondary memory such as the illustrated virtual memory system 402.

Profiling Overview

In various illustrated embodiments, profiling operates to monitor memory references to the data members of an object. Profiling can be achieved by a variety of methods. For example, the code of a program can be provided to an instrumentor, which writes instrumented code. When executed, the instrumented code produces memory-reference trace data for memory references to data members, which can be stored, for example, in a database. The memory-reference trace data can then be used to determine how the class loader arranges the data members of an object.

An exemplary database of memory-reference trace data might have a record for each memory reference to a data member to indicate the data member being referenced and when it was referenced in memory. Since profiling is typically applied to software having multiple objects with multiple data members referenced multiple times in memory, the database may become quite large. So, various techniques can be used to reduce its size. In some illustrated embodiments, the arrangement can be determined solely based on how many times each data member was referenced alone (without information about when it was referenced), so the memory-reference trace data need only keep a count of how many memory references were made to each data member being monitored. In other embodiments (e.g., an affinity-based technique), information about when the memory references were made is recorded.

Alternatively, a technique called "static profiling" might be used. Static profiling analyzes code without running it to determine profiling data. For example, it might be apparent from the code that a memory reference to one data member is performed responsive to a memory reference to another data member in a conditional statement.

Data Member Grouping Overview

When a developer specifies a software object, the specification includes a set of data members. At some point after the program is developed, these data members are translated from a high level definition (e.g., a set of data structures defined in C++ or a definition according to a scripting language) to an actual layout in the memory system (e.g., a virtual memory system). Many translation scenarios are possible. For example, the translation can be partially handled by a compiler, partially handled by an interpreter, or otherwise handled in a partially-compiled language.

For example, in the illustrated embodiments, a class loader loads an object into the virtual memory system when a program references an object. The class loader assigns an arrangement for the data members of the object by specifying which data members will reside where in the virtual memory system. Generally, the loader places more frequently accessed data members into a set of groups (called "hot groups") and less frequently accessed data members into another set of groups (called "cold groups"); however a group may fall anywhere in the spectrum between "hot" and "cold." The loader can place data members in the same group in neighboring locations in the virtual memory system. Further, the memory system typically has a set units (e.g., pages or blocks) that are separately loadable into primary memory.

Neighboring members in the same group tend to fall in the same pages of the virtual memory system. Members of different groups tend to reside in different pages of the virtual memory system. Consequently, when a program references a data member in one group, the virtual memory system tends to move the pages associated with the group having the referenced data member into primary memory, but the pages associated with the other group tend to be left behind in secondary memory.

A class loader could be constructed to interface with the virtual memory system to specifically assign the data members to particular pages of the virtual memory system. Further analysis of the arrangement could be done based on the size of a page in the virtual memory system.

Overview of Some Advantages

Arranging the data members with the class loader as described above results in several advantages. For purposes of comparison, consider a scenario in which the data members are not explicitly arranged by the class loader. For example, consider software in which thousands of references are made to various data members of an object over the lifetime of the object. Further, the resident set for the software is of such a size that it cannot accommodate all the data members, so page faults cause pages to be constantly swapped in and out of primary memory.

Some of the data members are particularly active; 98 percent of the references to data members are made to them. Some of the other data members are accessed only once over the lifetime of the object.

A class loader might unfortunately happen to place one of the active data members and one of the once-only data members alone on a page of virtual memory. Since the active member is referenced often, there could be many page faults for the page. For each page fault, the once-only member is copied into primary memory, even though it is accessed only once over the lifetime of the object. This phenomenon can be called "dragging around dead data" because the once-only data member is being repetitively copied into primary memory, even when it is not needed.

Instead, a more advantageous arrangement is for the class loader to place the data members into groups as described above. If the active data members are placed in one group, they will likely reside in the same pages of virtual memory. Likewise, if the once-only data members are placed in a different group, they will likely reside in the same pages of virtual memory. Accordingly, the "dead data" is less likely to be "dragged around" as references are made to the data members. In this way, the space of the resident set is used more effectively, resulting in fewer page faults.

Similarly, data members in the same groups will tend to co-reside in any cache that may be in the memory system (including processing unit-resident cache). Thus, properly grouping the data will also lead to fewer cache misses, making more effective use of the cache.

Illustrated Embodiments

A shorthand name for techniques that group data members of objects within memory to enhance performance is "data layout optimization." "Optimization" or "optimize" means improvement in the direction of optimal; an optimal layout may or may not be produced by a data layout optimization technique.

Figure 5:
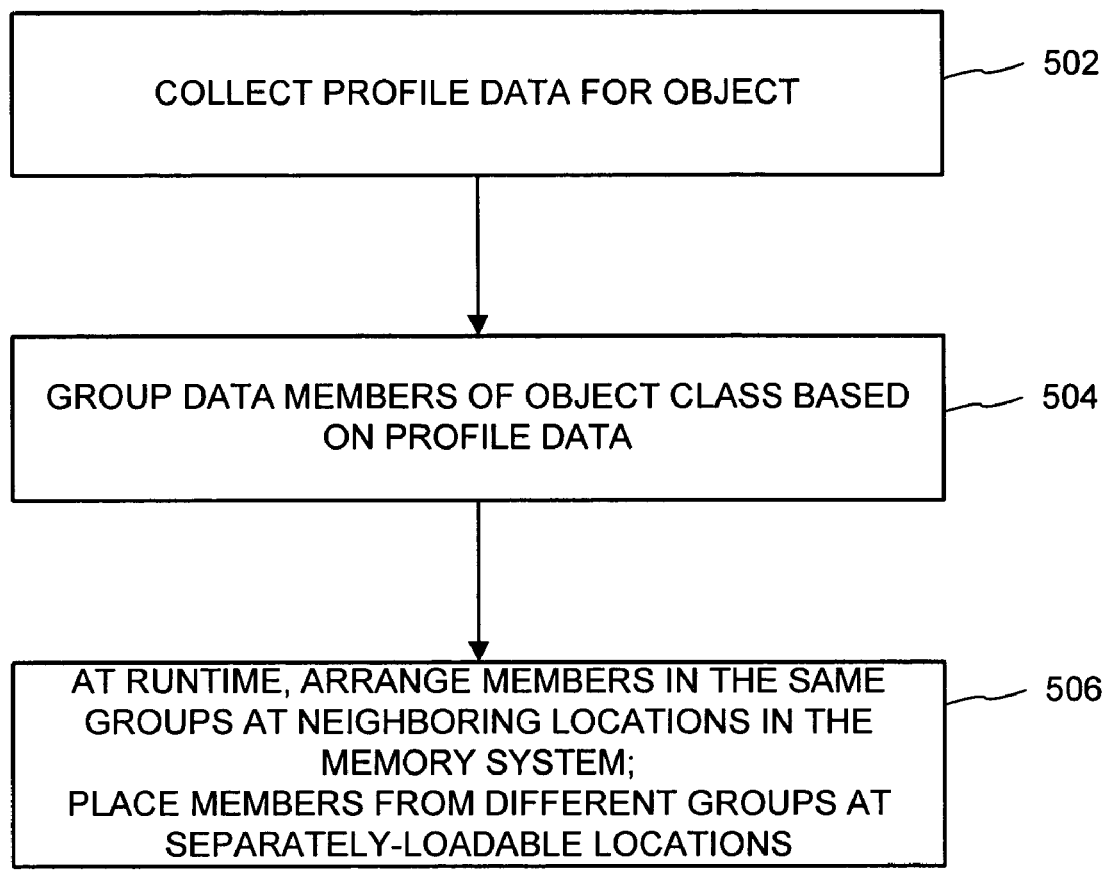
FIG. 5 is a flowchart showing an exemplary method for implementing data layout optimization.

An overview of an exemplary data layout optimization method is shown in FIG. 5. At 502, profile data for the object is collected. Examples of profile data are shown in the illustrated embodiments below. At 504, the data members of an object are grouped based on the profile data. Techniques for achieving such grouping are shown below. Then, at 506, at runtime, data members from the same groups are arranged at neighboring locations in the memory system; members from different groups are placed at locations separately loadable from each other (e.g., members from Group A are placed at locations in one page of memory, and members from Group B are placed at locations in another page of memory).

Figure 6:
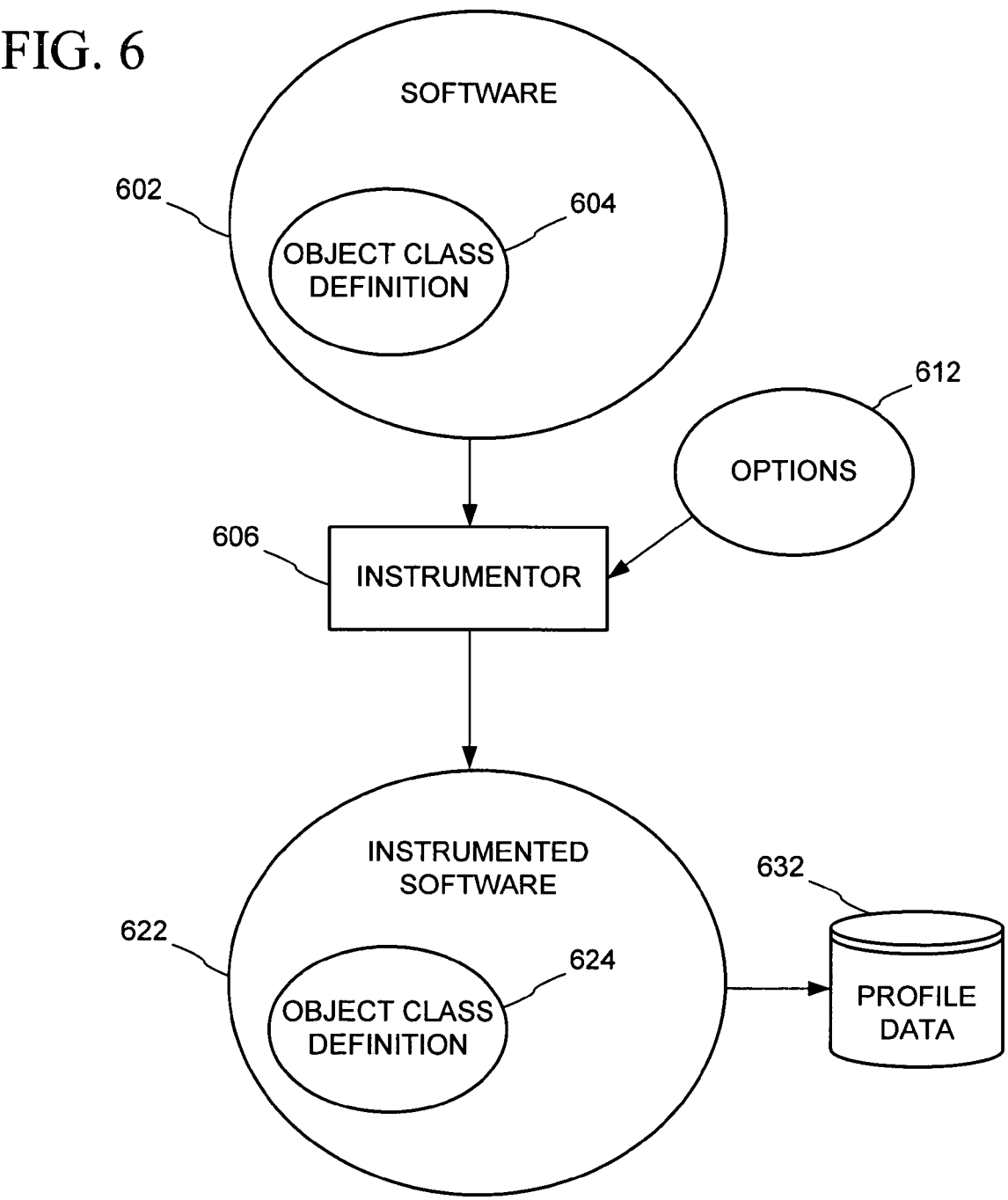
FIG. 6 is a block diagram showing an exemplary arrangement for collecting profile data.
Figure 7:
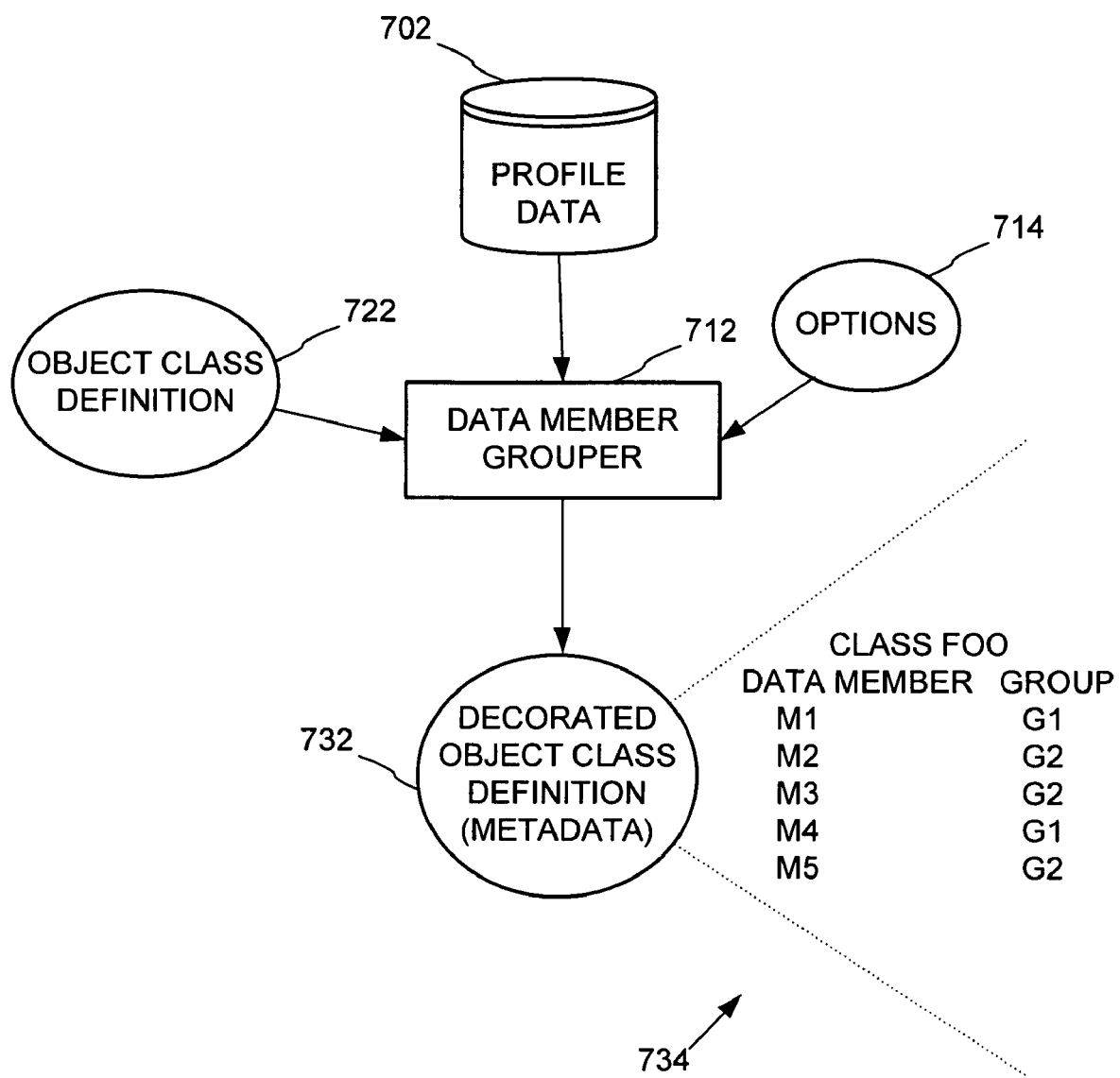
FIG. 7 is a block diagram showing an exemplary arrangement for grouping data members based on collected profile data, such as that of FIG. 6.
Figure 8:
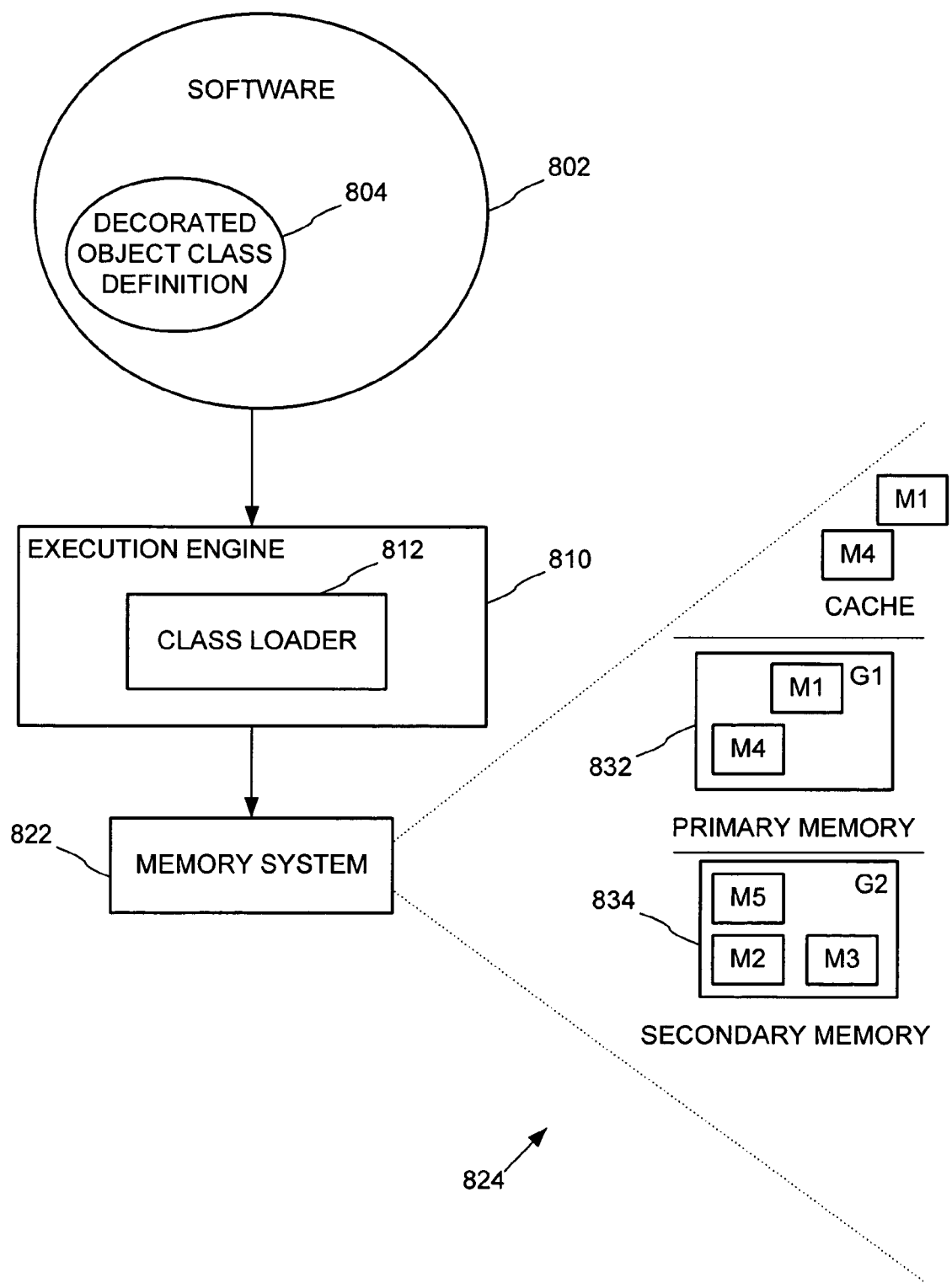
FIG. 8 is a block diagram showing an exemplary arrangement for executing software, grouping the data members of an object according to a grouping of data members, such as that of FIG. 7.

An overview of an exemplary architecture of a data layout optimization system is shown in FIGS. 6, 7, and 8. FIG. 6 shows an exemplary arrangement for collecting profiling data. The software 602 to be profiled includes an object class definition 604. For example, the object class definition 604 could specify a set of data members of varying sizes and types.

The instrumentor 606 takes the software 602 as input and produces the instrumented software 622 (which includes an object class definition 624 identical to or based on the object class definition 604) for generating the profiling data 632. Further, various options 612 can be specified to the instrumentor 606 to tailor the instrumented software 622 to generate various types of profiling data 632. In this way, profiling data for an object can be collected.

FIG. 7 shows an exemplary arrangement for grouping data members of an object based on profiling data. A data member grouper 712 consults the profiling data 702 (e.g., profiling data 632 from FIG. 6) to determine how the data members of the object class definition 722 should be grouped. The data member grouper 712 produces a decorated object class definition 732, which indicates in what groups the data members of the object class definition 722 will be grouped. Various options 714 can be specified to the data member grouper 712 to tailor the data member grouping process.

An exemplary decorated object class definition 732 is represented on a basic level as shown in inset 734. Data members $m_1$ and $m_4$ have been grouped into group $G_1$, and data members $m_2$, $m_3$, and $m_5$ have been grouped into group $G_2$. A variety of other information can be included in the decorated object class definition 732 to further specify layout as described in more detail below.

FIG. 8 shows an exemplary arrangement for arranging the data members in the same group at neighboring locations in the memory system at runtime. The software 802 includes a decorated object class definition 804, such as the decorated object class definition 732 of FIG. 7. At runtime, an execution engine 810 executes the software. During execution, the class loader 812 arranges data members of the object in the memory system 822 by placing data members in the same group at neighboring locations in the memory system 822. Further, data members from one group can be placed in a unit of memory separately loadable from data members of another group.

As the program is run, the memory system 822 may appear as generally shown in inset 824. Two data members $m_1$ and $m_4$ of group $G_1$ reside in one page 832 in primary memory of the memory system 822 and have also been placed in cache. Two other data members $m_2$, $m_5$, and $m_3$ of group $G_2$ reside in another page 834 in secondary memory of the memory system 822. The data members of group $G_2$ are separately loadable into primary memory, and are not currently loaded into primary memory.

An advantage to the arrangement shown in FIG. 8 is that if the data member grouper has placed, for example, more frequently used data members in group $G_1$ and less frequently used data members in group $G_2$, fewer page faults and cache misses will result. This is partly because each page fault for the page 832 brings in the group $G_1$ of the more referenced data members, while leaving the less referenced data members behind in page 834. Thus, in effect, a page of primary memory is conserved for use by another page (e.g., one which would have been replaced to load in the data members in group $G_2$).

The overview shown in FIGS. 5-8 is a basic representation of possible implementations of a data layout optimization technique. In practice, the data layout may involve many more objects, data members, and pages (or other units of memory) in a memory system.

Instrumentation

A wide variety of instrumentation techniques can be used to generate profile data for use during data layout optimization. Some tools capture complete traces of software by generating a record in a database for each memory reference to any data. Such a trace can prove to be quite large, so various techniques can be used to reduce the size of the profile data. On a general level, the instrumentation attempts to measure the number of memory references to data members of an object (e.g., fields of an object).

An exemplary format for data captured during instrumentation appears in Table 1.

TABLE 1

Logical Data Captured for Data References

| Field | Description |
|---|---|
| ObjClass | Class of the Object having data being referenced |
| FieldID | Identifier of the data member (e.g., field) of the object being referenced |
| StaticOrNot | Boolean field to indicate whether the data member is a static field |
| Width | Width of data member (e.g., byte, dword, etc.) |
| RefType | Either "read" or "write" |
| Time | Indicates a time at which the data was referenced (e.g., microsecond resolution or better) |
| ObjectID | Identifier of the object instance |

Some of the described fields (e.g., Width, RefType, Time, and ObjectID) might be useful for research to further improve data layout optimization (e.g., to research more specialized reorganization heuristics), but need not be implemented in practice.

One way of reducing the size of the profile data is to track the number of memory references in counters (e.g., a read counter and a write counter) for each data member and then write one record to the database for each method call. Preferably, the counters are 64-bit integers. In such a system, repetitive entries of the format shown in Table 2 can be used.

TABLE 2

Profiling Data Captured for References During a Method Call

| Field | Description |
|---|---|
| ObjClass | Class of the Object having data being referenced |
| FieldID | Identifier of the data member (e.g., field) of the object being referenced |
| StaticOrNot | Boolean field to indicate whether the data member is a static field |
| Hits | Number of memory references to the data member |
| Width | Width of data member (e.g., byte, dword, etc.) |
| ReadHitCount | Number of memory references reading the data member |
| WriteHitCount | Number of memory references writing to the data member |

Again, some of the fields are optional, and the field Hits can be derived from ReadHitCount+WriteHitCount (if used).

Another instrumentation technique involves setting a timer and then tracking the number of memory references to each data member in counters (e.g., read and write counters). Upon expiration of the timer, a record with a column for each data member is written to the database and the counters are reset to zero. For data members having zero references, space can be saved by omitting the number. The format of such records resembles those shown in Table 2.

Still another technique involves using an overflow interrupt. On machines supporting an overflow interrupt, a record is generated when such an overflow interrupt is generated due to a counter overflow. Upon overflow, a record is written to the database.

Still another technique possibly used in conjunction with the method-based or timer-based technique (or similar techniques) is one that generates a record for the database whenever an overflow of the counter is likely. The likelihood of overflow can be represented by saving the time trend of the counts and extrapolating. Example code for forecasting an overflow is shown in FIG. 9. The counter L tracks the number of memory references (i.e., "hits") to a data member of a certain object class during, for example, a method call. The code shown in FIG. 9 is executed upon exit from an object's method. The counter H is an overall counter tracking sums of L. Steps are taken to avoid an overflow of H.

Figure 10:
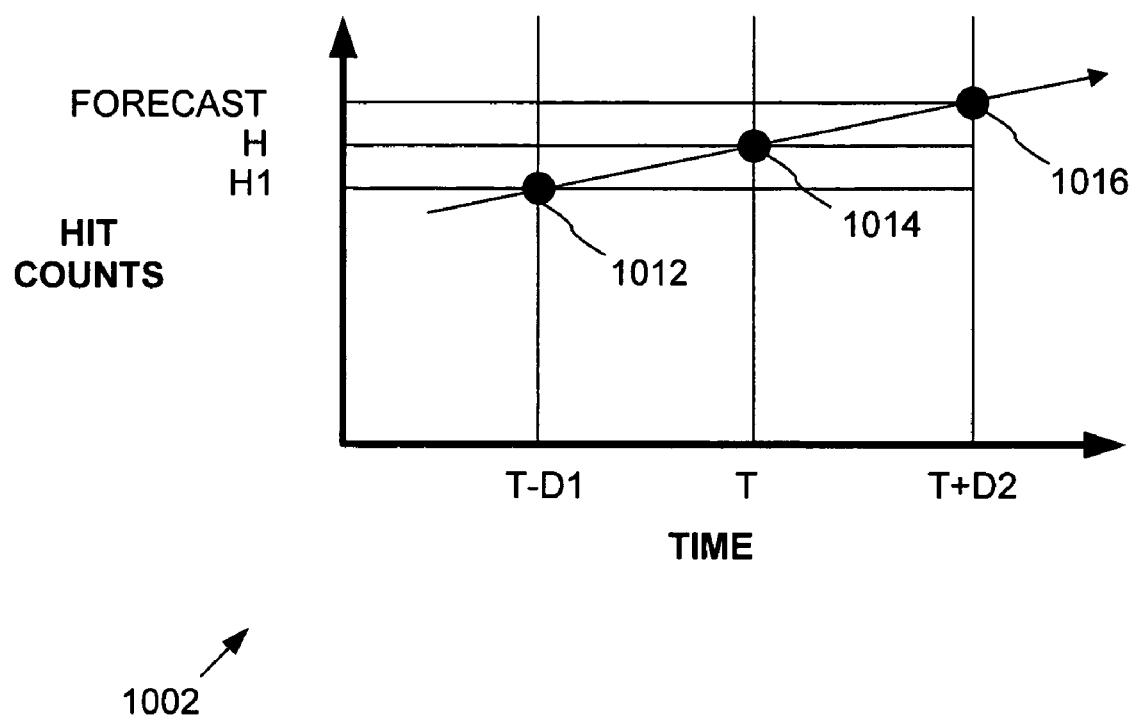
FIG. 10 is a graph illustrating derivation of an overflow forecast method for use when tracking the likelihood of a counter overflow during collection of profile data, such as in FIG. 9.

Derivation of the forecaster formula "(H−H1)+H" is illustrated in the graph 1002 of FIG. 10. Assume 1012 represents a point at which the value of the overall counter was observed to be H1 (the previous value of the overall counter) at time T−D1. Further, 1014 represents a point at which the overall counter was observed to be H at time T. Point 1016 represents a point at which the overall counter will be observed to be the forecast value F at time T+D1 (e.g., after the next method call). Point 1016 can be extrapolated as shown in Table 3.

TABLE 3

Extrapolation of Overflow Value $$F(\text{Forecast value}) = H + \frac{(T+D2) - T}{T - (T-D1)}(H - H1)$$

Assuming D1 and D2 are both D, we have

TABLE 3-continued

Extrapolation of Overflow Value $$F = H + \frac{(T+D) - T}{T - (T-D)}(H - H1)$$
$$= H + \frac{T + D - T}{T - T + D}(H - H1)$$
$$= H + \frac{D}{D}(H - H1)$$
$$= H + (H - H1)$$

Thus, if it is determined that an overflow of the overall counter is likely, the counter is written to a database, and the overall counter is begun anew. The illustrated technique can be extended to construct forecasters of quadratic or higher degree.

Greedy Data Layout Optimization Technique

One data layout optimization technique, sometimes called "greedy," groups the data members based on a simple ordering by the number of memory references as indicated by the profile data. The technique is greedy in the sense that data members having more references (as indicated by the profile data) are placed in a more favored group. The following illustrates various possible greedy data layout optimization techniques.

Using an instrumentation technique, such as one of the instrumentation techniques described above, profiling data such as that shown in Table 4 can be collected for an object class Foo during execution of a piece of software.

TABLE 4

Profile Data for Class Foo

| Data Member | References |
|---|---|
| $m_1$ | 47 |
| $m_2$ | 0 |
| $m_3$ | 5 |
| $m_4$ | 34 |
| $m_5$ | 1 |

In the example, the profile data generally indicates that certain data members are referenced more than others are. The profile data can thus be used to determine how to group the object's data members.

Greedy Grouping Technique

In a greedy grouping technique, arrangement of data members is determined by sorting the fields from most referenced in memory to least referenced in memory. Various criteria can then be used to place the data members into "hot" (more referenced) and "cold" (lesser referenced) groups. Assuming the lesser referenced data members are less likely to be accessed at any given time, the greedy technique increases performance by facilitating loading the hotter groups into more readily accessible memory without having to move the data members in the colder groups along with them.

Data Layout Optimization Assistance Tools

Various techniques can be used to determine how to split a class (i.e., group the data members into groups). The examples listed here show splitting the data members into two groups, but a similar technique is used to split-data members into three or more groups.

A simple splitting technique simply specifies a threshold (e.g., percentage of references) and splits the data members of a class into two groups: a hot group and a cold group. If the profiling data indicates a particular data member has at least the threshold (e.g., percentage of the references), it is placed in the hot group; data members having less than the threshold (e.g., percentage of references) are placed in the cold group.

In practice, however, the splitting technique can be more complex. A variety of techniques or mixture of techniques may result in superior performance. In some cases, it may not be advantageous to split the data members. For example, in an implementation in which splitting the data members introduces overhead, it is not advantageous to split a class into a hot group and a cold group if the size of the overhead in the hot group is not smaller than the size of the cold group.

An analysis of the profile data can be used to provide tools for assistance in deciding whether to split a class. These tools can be used, for example, by a developer to specify parameters during the data layout optimization process. Such tools include a threshold framework and a policy framework. The frameworks use formulas for hit-count statistics shown in Table 5 and global hit-count statistics shown in Table 6. The term "hit" is used to mean a memory reference to a data member (e.g., a object field).

TABLE 5

Hit-Count Statistics for Class $C_i$ $C_i \cdot NF$ = number of fields in class $C_i$
$C_i \cdot HC_j$ = number of hits on field j of class $C_i$.

$$C_i \cdot HC \text{ (total hit count in class } C_i) = \sum_{j=1}^{C_i \cdot NF} C_i \cdot HC_j$$

$$\text{Then, } C_i \cdot HA \text{ (the average hit count in class } C_i \text{ per field)} = \frac{C_i \cdot HC}{C_i \cdot NF}$$

$$C_i \cdot HC2 \left(\text{sum of squares of hit count in class } C_i\right) = \sum_{j=1}^{C_i \cdot NF} (C_i \cdot HC_j)^2$$

$$\text{Then, } C_i \cdot SD \text{ (standard deviation of hit counts in class } C_i) = \sqrt{\frac{1}{C_i \cdot NF} \sum_{j=1}^{C_i \cdot NF} (C_i \cdot HC_j - C_i \cdot HA)^2}$$
$$= \sqrt{\frac{1}{C_i \cdot NF} C_i \cdot HC2 - (C_i \cdot HA)^2}$$

TABLE 6

Global Hit-Count Statistics

NC = number of classes in profiling data for a program $$GNF \text{ (global number of fields in all classes)} = \sum_{i=1}^{NC} C_i \cdot NF$$

$$GHC \text{ (global hit count)} = \sum_{i=1}^{NC} C_i \cdot HC$$

$$GHA \text{ (global average hit count per field)} = \frac{GHC}{GNF}$$

TABLE 6-continued

Global Hit-Count Statistics $$\text{GHC2 (sum of squares of hit counts in all classes)} = \sum_{i=1}^{NC} (C_i \cdot HC)^2$$

$$\begin{aligned}\text{GSD (standard deviation} \\ \text{of hit counts in all classes )}\end{aligned} = \sqrt{\frac{1}{GNF}\sum_{i=1}^{NC}(C_i \cdot HC - GHA)^2}$$

$$= \sqrt{\frac{1}{GNF}GHC2 - (GHA)^2}$$

Given the above formulas, a threshold framework provides at least three ways to specify thresholds for determining when to split a class: absolute, specified in a scalar number of hit counts (e.g., "127 hits"), Gaussian, specified in standard deviations, and linear, specified as a multiple of average hit counts.

Absolute thresholds have the advantages of precision and convenience. Although absolute thresholds depend on the total number of hits in a profiling run, they can be normalized by dividing all hit count measurements by GHC.

Gaussian thresholds have the advantage of being in a manageable range (e.g., 1-3). However Gaussian thresholds assume the hit counts have a normal distribution, which is not the case if the distribution is bimodal (e.g., there are a large number of fields with many hits and a large number of fields with zero hits).

Linear thresholds are often larger numbers than the Gaussian thresholds, but do not assume a normal distribution. A number of other techniques (e.g., rank-order or non-parametric statistics) could also be used.

For example, consider the profiling data in Table 7 and the corresponding analysis of Table 8. For purposes of example, assume the global average hit count per field (GHA) is 34.

TABLE 7

Profile Data for Class Foo

| Field | Hits |
| --- | --- |
| $f_1$ | 47 |
| $f_2$ | 0 |
| $f_3$ | 5 |
| $f_4$ | 34 |
| $f_5$ | 1 |

TABLE 8

Analysis of Profile Data for Class Foo

Foo.NF number of fields in class Foo = 5
Foo.$HC_1$ number of hits on field 1 of class Foo = 47.
Foo.$HC_2$ = 0, Foo.$HC_3$ = 5, Foo.$HC_4$ = 34, Foo.$HC_5$ = 1.
Foo.HC (total hit count in class Foo) = 87
Foo.HA (the average hit count in class Foo per field) = 17.4
Foo.HC2 (sum of squares of hit count in class Foo) = 3391
Then, Foo.SD (standard deviation of hit counts in class Foo) = 19.4

An exemplary absolute threshold for the class Foo would be "10," meaning group any field with a hit count less than 10 in the cold group. An exemplary linear threshold for class Foo would be "0.5," meaning group any field with a hit count less than half the mean (i.e., 8.7) to the cold group. An example of a Gaussian threshold for Foo would be "−0.5," meaning group any field with a hit count less than 7.7 (i.e., half a standard deviation below the average 17.4) in the cold group. However, it should be noted the distribution of the hit counts is not normal.

Using the above formulas, a policy framework can be constructed to help specify when a class should be split into groups of data members. Given a proposed (or "candidate") cold group, a policy within the framework specifies whether or not the class should be split. Typically, the proposed cold group is specified via a threshold from the threshold framework.

The policy framework is useful, for example, to provide a way for a developer to provide guidance to the splitting process. In the policy framework, a default policy can be specified to apply to all classes. Further, the default policy can be overridden by specifying a policy for a particular class. Essentially, the policy specifies a Boolean result, which determines whether or not to split the class based on the proposed cold group. The policy framework provides the options shown in Table 9.

TABLE 9

Global Policy Defaults

| Policy | Split if the cold group is bigger than . . . | Split if . . . |
| --- | --- | --- |
| H( ) | Hot group overhead only (this policy is the default if no policy specified) | size of cold group > size of hot group overhead |
| HC( ) | Hot group overhead and cold group overhead | size of cold group > (cold group overhead + hot group overhead) |
| HFC(f) | Hot group overhead and a fraction, f, of cold group overhead | size of cold group > (f * cold group overhead + hot group overhead) |
| HFA(f) | Hot group overhead and cold group overhead if cold is warmer than fraction f of GHA | (((hit count for cold group/ number of fields in cold group) > (f * GHA)) && HC( )) \|\| H( )) |

The "Split if the cold group is bigger than . . . " and "Split if . . . " columns specify the same criteria in two different ways. The policies can be used to accommodate a wide variety of situations. For example, it is clear that a class should not be split if the overhead created in the hot group by splitting is greater to or equal to the size of the fields in the cold group. This fact is embodied in the policy H( ). However, how to proceed in light of the overhead created in the cold group is more challenging.

For example, if the cold group is very cold, the space overhead created in the cold group may be tolerable since the cold group will not be referenced much. However, if the cold group is merely "cool," the cool group will be referenced more frequently, and it is more a matter of judgment on how to proceed. The above-described policy framework provides a way to specify how to proceed in light of such scenarios.

The threshold and policy frameworks can provide a way for the developer to guide the data layout optimization process. For example, a software developer may have identified a particular class as large and critical to performance. The software developer can contribute this knowledge to the automatic optimization process by specifying these classes (e.g., in a command line or in a file) in conjunction with instructions on what threshold and policy to use.

Thus, the developer can specify a threshold and policy for each class. Other tools provided to the developer include options for specifying that all or only a subset of the classes should be considered for splitting. An exemplary command line interface for specifying the options is shown in a later section.

Splitting a Class According to a Greedy Method

For each class specified as a candidate for splitting, the threshold and policy are applied to determine whether and how to split the class. For example, returning now to Table 7, assume a linear threshold was specified to indicate that fields with a hit count greater than or equal to the global average hit count (GHA=34) are to be placed in a hot group for the class; other fields are to be placed in a cold group. Thus, fields $f_1$ and $f_4$ are grouped in the hot group, and fields $f_3$, $f_5$, and $f_2$ are grouped in the cold group.

Metadata Associated with the Execution Engine

The above-described grouping of data members can be used when the program is executed to arrange the data members from the same group into neighboring locations in a memory system and place data members from different groups into separately-loadable units of memory. One way of accomplishing such arrangement is to generate metadata for use by an execution engine at run time. The term "metadata" generally means, "data about the data." In other words, the metadata provides information about the data members of an object, namely into what groups the data members have been placed and thus, how they should be arranged at runtime.

For example, a format such as that shown in Table 10 can be used to specify various options to be used by a class loader of an execution engine.

TABLE 10

Metadata Format for Specifying Groups

Class C
    LayoutType = (AutoLayout, ExplicitLayout, or SequentialLayout)
    Data Member $m_1$:
        [Position]
        Offset/Delta (offset if ExplicitLayout, shift if SequentialLayout)
        SplitGroupID (zero means no grouping)
    Data Member $m_n$:
        [Position]
        Offset/Delta
        SplitGroupID The Metadata format includes various layout directives. The LayoutType can specify AutoLayout, ExplicitLayout, or SequentialLayout. AutoLayout (typically the default) leaves the execution engine to arrange the data members as it sees fit (i.e., in any order and at any location). ExplicitLayout is one option useable when data members are grouped; when specified, this option causes the execution engine (and class loader) to place the data members at the locations (offsets) supplied. The data member grouper computes the appropriate values based on, for example, the size of the data members. SequentialLayout is another option useable when data members are grouped; when specified, this option causes the execution engine (and class loader) to place the data members in the order supplied, without specifying actual offsets.

Following the LayoutType is a specification for data members of the class. Position may be specified, or it can be implied by the order in which the data members appear (i.e., the first data member is assigned a position of 1).

Offset/Delta can take on different meanings. If the option ExplicitLayout has been specified, Offset/Delta specifies an actual offset (from the top of the object or group) at which the data member is located. Overlapping layout (e.g., for unions) can be permitted. If the option SequentialLayout has been specified, Offset/Delta specifies a shift indicating how far after the present data member the next data member starts (essentially, the data member's size). Another optional field, not shown, specifies the field preceding the present field (the PredecessorField).

Exemplary metadata for a class Foo that has been split into two groups of fields ($f_1$ and $f_4$) and ($f_3$, $f_5$, and $f_2$) is shown in Table 11.

TABLE 11

Metadata for Foo

Class Foo
    LayoutType = ExplicitLayout
    Data Member $f_1$:
        Offset/Delta: 0
        SplitGroupID: 1
    Data Member $f_4$:
        Offset/Delta: 3072
        SplitGroupID: 1
    Data Member $f_3$:
        Offset/Delta: 0
        SplitGroupID: 2
    Data Member $f_5$:
        Offset/Delta: 1024
        SplitGroupID: 2
    Data Member $f_2$:
        Offset/Delta: 1056
        SplitGroupID: 2

The metadata can, for example, reside with the respective class definition, or be specified in a central repository of metadata for the execution engine. An alternative to the above arrangement would be to specify a SequentialLayout while still specifying different groups for the fields. The above data format is an example of one of many possible formats for specifying how data members of an object can be placed into groups. Specifying such information for data members is sometimes called "decorating" the class (or software module) with metadata.

Arranging the Data Members at Runtime

Figure 11:
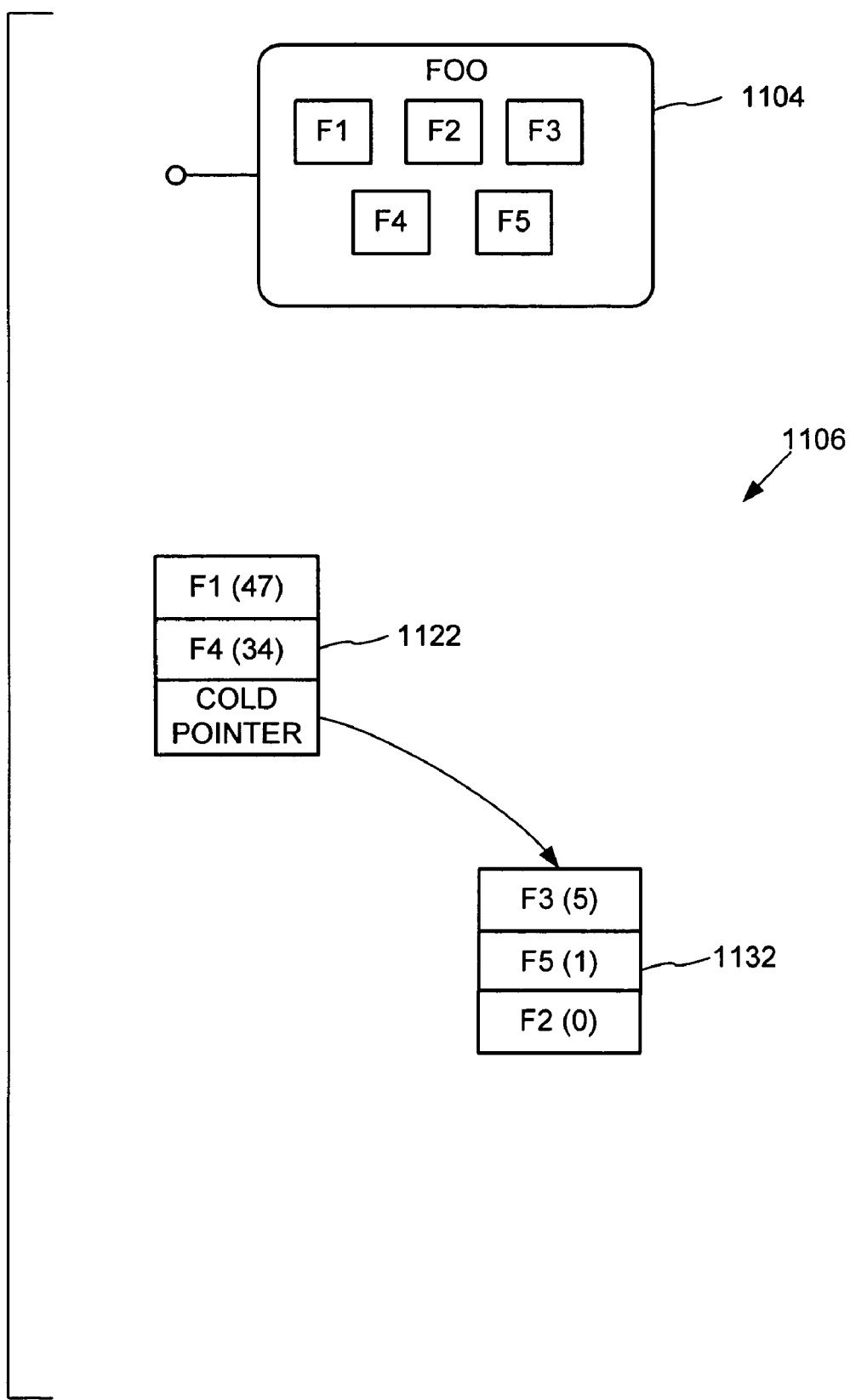
FIG. 11 is a block diagram showing an exemplary general layout of fields for the class Foo in a memory system.

At runtime, the metadata can be consulted to determine how to actually arrange the data members in the memory system. From the perspective of software accessing an object, the data member arrangement is inconsequential. For example, an instance 1104 of an object of a class called "Foo" might appear to software as shown in FIG. 11. A class loader placing an instance of the class Foo in memory might layout the fields in separately-loadable groups 1106 if the class definition is decorated with metadata as described above. Fields $f_1$ and $f_4$ are placed at neighboring locations in a hot group 1122, which has a pointer to the cold group 1132, containing fields $f_3$, $f_5$, and $f_2$ at neighboring locations separate from the hot group 1122. The number of references for each of the fields is shown in FIG. 11; however, this data need not reside with the field in memory.

Figure 12:
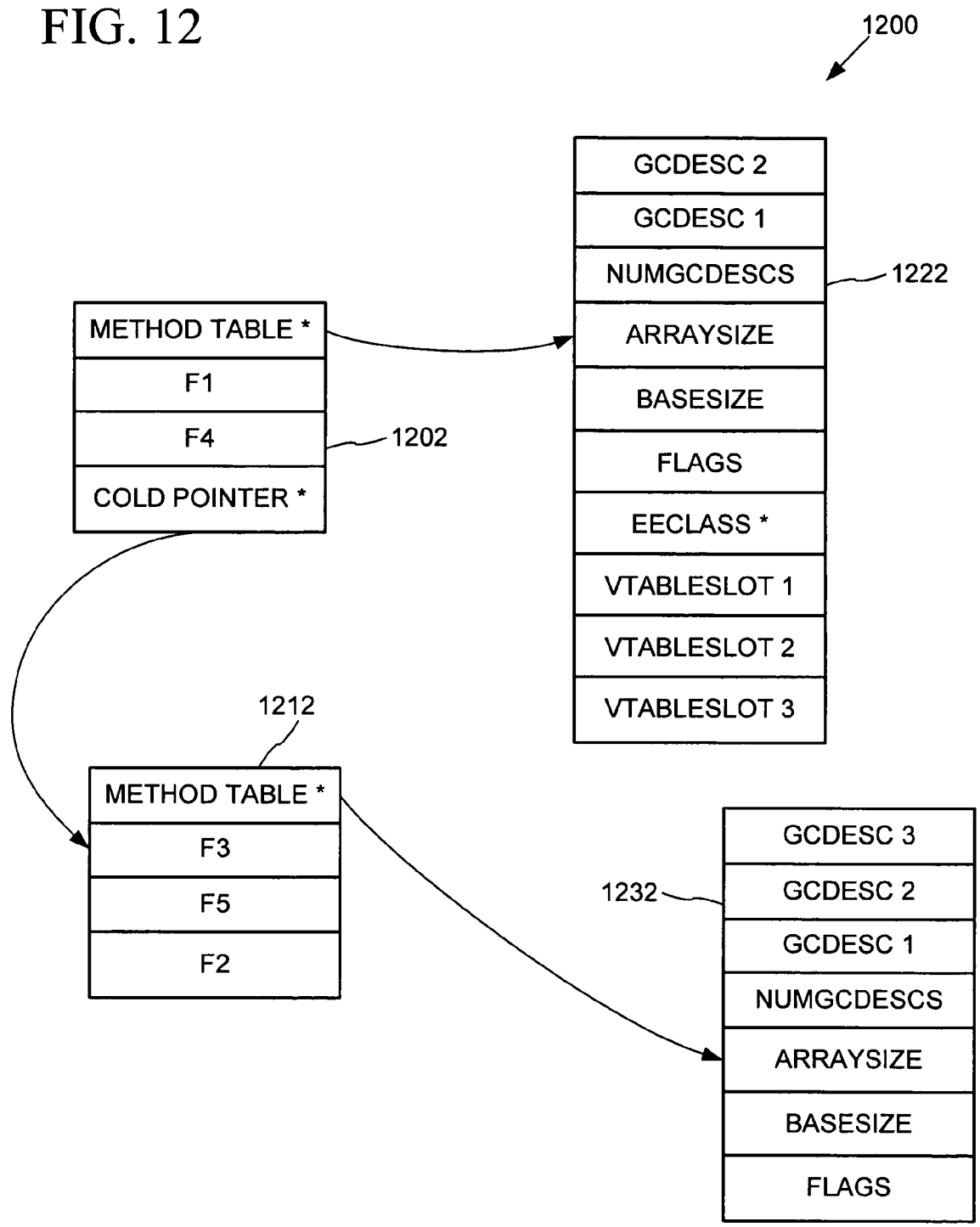
FIG. 12 is a block diagram showing a more detailed approximation of an exemplary layout of fields for the class Foo in a memory system.

The layout in FIG. 11 is meant as a general guide. A more detailed approximation of how the object would actually appear is shown in FIG. 12, which again shows how an instance 1200 of the class Foo might appear in memory. A hot group 1202 contains the fields $f_1$ and $f_4$ and a cold group 1212 contains the fields fields $f_3$, $f_5$, and $f_2$. The hot group 1202 further includes a pointer to the object information set 1222, and the cold group 1212 further includes a pointer to the object information set 1232. The object information sets 1222 and 1232 provide, for example, information for garbage collection functions and VTableSlots that point to function members of the object. In some cases, there may be gaps between the fields, and an implementation could be constructed that uses an alternative VTable arrangement or an arrangement not using a VTable. The principle of data layout optimization can be implemented without various of the fields shown, including the fields related to garbage collection.

As a result of the arrangement described above, fields in the same group tend to reside in the same unit(s) (e.g., page or pages) of virtual memory in the memory system, and fields in different groups tend to reside in different units, separately loadable into primary memory from units for other groups. During execution, then, the fields in the hot group are more likely to occupy primary memory than fields in the cold group. Further, the software tends not to fill up its available primary memory (e.g., the resident set) with fields in the cold group, which are relatively seldom referenced.

Exemplary Operation

Data layout optimization of an object class increases performance during execution of a piece of software that makes use of the object class. For example, for purposes of comparison, the following two examples demonstrate how data layout optimization better utilizes primary memory and reduces page faults and cache misses. For purposes of the examples, when data is referenced, the cache copies the referenced data and a portion of the data following the referenced data.

Figure 13:
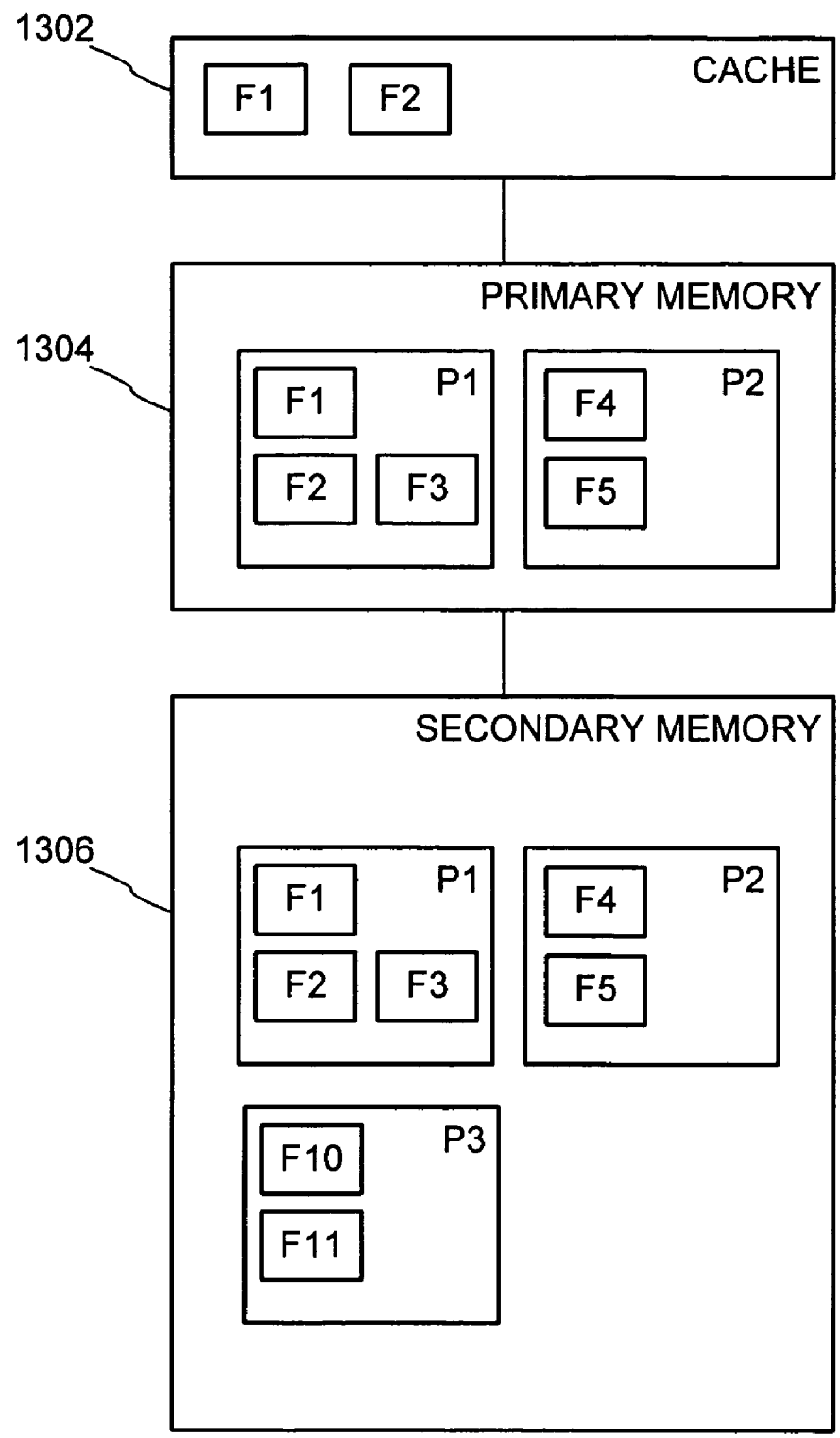
FIG. 13 is a block diagram showing a memory system during execution of software not optimized with data layout optimization.

In the first example, shown in FIG. 13, assume the exemplary class Foo were laid out (e.g., the fields $f_1$, $f_2$, $f_3$, $f_4$, and $f_5$) without regard to the profile data and thus were arranged in sequential order by the class loader. Accordingly, fields $f_1$, $f_2$, and $f_3$, have been placed in one memory page $P_1$ and fields $f_4$, and $f_5$ have been placed in another memory page $P_2$. Fields $f_{10}$ and $f_{11}$ are of another class called "baz" and reside in another memory page $P_3$.

Each of the memory pages pictured is separately loadable into the primary memory 1304. And, in fact, during execution, two pages $P_1$ and $P_2$ have been loaded into the primary memory 1304 since the software has been referencing fields $f_1$ and $f_4$ of the object Foo (as the profile data indicated was likely). Assume the most recent reference to a data member was to $f_1$; accordingly, f, and $f_2$ (data following $f_1$) have found their way into the cache 1302. The software then references $f_4$ (a likely memory reference, based on the profile data). At this point, a cache miss results. Further, when the second page $P_2$ was loaded into memory, it replaced another page $P_3$ having a field $f_{11}$ that is about to be referenced shortly for the baz object. Accordingly, a page fault results when $f_{11}$ is referenced, and $P_3$ is copied from secondary memory 1306. We thus have a cache miss and a page fault.

Figure 14:
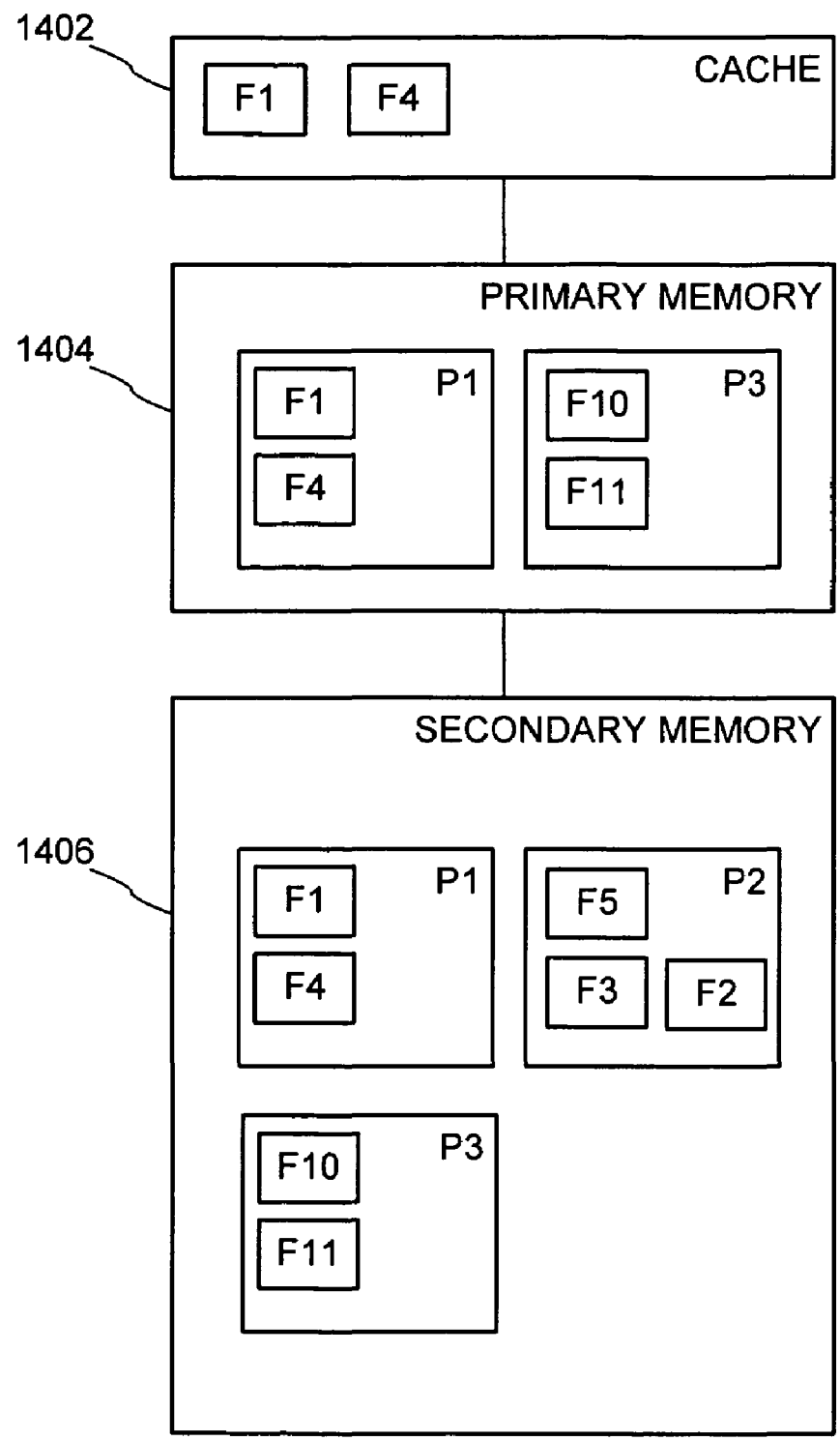
FIG. 14 is a block diagram showing a memory system during execution of software optimized with data layout optimization.

By contrast, consider the same software that has been optimized with data layout optimization as described above (e.g., the fields $f_1$ and $f_4$ reside in a hot group and $f_3$, $f_5$, and $f_2$ reside in a cold group). During execution, the software has been referencing fields $f_1$ and $f_4$ of the object Foo, as the profile data indicated was likely. Such references resulted in the arrangement shown in FIG. 14, where one page $P_1$ from the virtual memory system containing fields $f_1$ and $f_4$ has been loaded into the primary memory 1404 for the Foo object. Assume the most recent reference to a data member was to $f_1$; accordingly, $f_1$ and $f_4$ have found their way into the cache 1402. The software then references $f_4$ (as in the example of FIG. 13). At this point, there is no cache miss. Further, since $P_2$ has yet to be loaded into primary memory, the page $P_3$ was permitted to stay in primary memory. Accordingly, there is no page fault when $f_{11}$ is referenced, and $P_3$ need not be copied from secondary memory 1406. Thus there were no cache misses and no page faults.

As demonstrated by the above example, data layout optimization can result in loading fewer pages into primary memory (e.g., resulting in fewer page faults) and fewer cache misses. The above example is simplistic, but a more complex system exhibits similar benefits. Another way of describing the improvement in performance is to note that primary memory is not wasted by filling it with fields from the cold group every time there is a reference to the hot group. In this way, if the principles of data layout optimization are applied to a set of objects, primary memory tends to fill with fields that are frequently accessed (e.g., from the set of objects), and better use is made of the primary memory available to the software.

Using the Time Domain in an Affinity-Based Technique

Although the greedy technique described above may lead to dramatic improvements in performance in some instances, an affinity-based technique may be even better because it takes the time domain into account. Generally, the affinity-based technique strives to place data members referenced close in time close in location within the memory system. One embodiment described below performs a dot product calculation to determine affinity.

Again, various techniques can be used to determine how to split the data members into groups. For example, an embodiment described below finds the minimum-cost spanning tree of a graph defined in terms of affinity between the data members.

Instrumenting for an Affinity-based Technique

Since the affinity-based technique takes the time domain into account, instrumentation of the software somehow represents the time domain in the profile data generated. Various techniques described in the section on a greedy technique can be used as long as they somehow incorporate the time domain. For example, the timer-based technique would work with an affinity-based data layout optimization technique.

Profile Data for an Affinity-Based Technique

Exemplary profile data for use in an affinity-based technique represents references to an object class called "Bar" and is shown in Table 12.

TABLE 12

| Field | Profile Data for Class Bar |   |   |   |   |
|-------|---|---|---|---|---|
|       | Hit Counts | | | | |
| $f_1$ | 5 | 6 | 7 |   |   |
| $f_2$ |   | 2 |   | 5 | 5 | 5 |
| $f_3$ |   |   |   | 6 | 6 | 5 |
| $f_4$ | 3 | 4 | 5 |   |   |

The hit counts in Table 12 represent references made to the data members (e.g., fields) of a particular class during various (e.g., sequential) observation periods. Thus, for instance, the first column of Hit Counts indicates that the fields $f_1$ and $f_4$ were referenced 5 and 3 times respectively during a particular observation period. In other words, each cell in Table 12 represents the number of references to a field between two times, $t_1$ and $t_2$. In this way, Table 12 incorporates the time domain into the profile data because memory references near in time appear in the same column.

Transforming the Profile Data into a Minimum-Cost Spanning Tree

In order to determine how to group the data members of a class based on profile data such as that shown in Table 12, the profile data can be transformed into a minimum-cost spanning tree problem, the solution to which is established and well-known. Such transformation is accomplished by constructing an affinity matrix for the profile data, then transforming the affinity matrix into a cost matrix, which represents a graph for which a minimum-cost spanning tree can be found and traversed to determine an appropriate data member order.

Constructing the Affinity Matrix

An affinity matrix indicates which fields are referenced near each other in time. For example, treating the entries for the fields shown in Table 12 as time vectors, an affinity matrix can be constructed by calculating the dot product of the vectors. Thus, the affinity of data member A to data member B can be calculated as shown in Formula 1, where T is the number of time samples.

$$A \cdot B \equiv \sum_{t=1}^{T} A[t]B[t] = A[1]B[1] + A[2]B[2] + \ldots + A[T]B[T] \quad (1)$$

Self-affinities (e.g., A•A and B•B) allow the affinity-based approach to degrade to a simply greedy technique when there is no affinity between the data members.

One way of describing the profile data is to call it a matrix V, of size N×T, where N is the number of data members, and T is the number of time samples. Then the affinity matrix is the matrix V matrix multiplied by V transpose. The affinity matrix is thus square (N×N). Typically, N is smaller than T, so the affinity matrix will be smaller than V (the profile data) and more easily stored. In the example, calculation of the affinity matrix is of complexity N*N*T. To reduce time complexity or reduce the amount of storage needed for the profile data, T (the number of time samples) can be reduced. Preferably, the affinities are computed using 128-bit integers (e.g., a pair of native 64-bit integers).

If there are N fields in an object class definition, then there are N(N+1)/2 meaningful entries in the affinity matrix (the matrix is symmetric). A numerically larger entry in the affinity matrix indicates greater mutual locality of the two fields corresponding to the indexes of the entry, and therefore, generally, a greater desirability to lay them out nearby in space (e.g., at neighboring locations or on the same page in memory).

When the above-described calculations are performed on Table 12, the result is as that shown in Table 13.

TABLE 13

Affinity Matrix for Class Bar

|  | $f_1$ | $f_2$ | $f_3$ | $f_4$ |
|---|---|---|---|---|
| $f_1$ | 110 | 12 | 0 | 74 |
| $f_2$ |  | 79 | 60 | 8 |
| $f_3$ |  |  | 97 | 0 |
| $f_4$ |  |  |  | 50 |

According to Table 13, then, $f_1$'s affinity with $f_2$ is 12 (less than $f_1$'s affinity with $f_4$, which is 74). The self-affinities are included on the diagonal. If any field has a self-affinity of zero (there are none in Table 13), the field was not accessed during profiling and can be put at the bottom of the layout list. Further, an internal consistency check (sometimes called an "ASSERT") is available because any field with a zero self-affinity should also have a zero dot product with every other vector. So, for a field with a zero on the diagonal, an assert can be made that entries in the same row also be zero.

One way of describing the affinity matrix is to call the vectors represented in Table 12 geometrical vectors in a Euclidean space. This space has a number of dimensions equal to the number of time samples, T. Each dimension, then, is a time-slice in which objects may be active. The magnitude of a vector in Euclidean space is the root sum of squares of the components. Thus, self-affinities in Table 13 are squared magnitudes of the time vector for objects of a particular class. The off-diagonal affinities are dot products in the geometrical sense under this approach.

Thus, the off-diagonal affinities can be related to the magnitudes of two vectors and an angle between them as shown in formula 2.

$$A \cdot B = \|A\| \|B\| \cos(\vartheta) \quad (2)$$

This angle can be described as a measure of the nearness of two time vectors in Euclidean space, independent of their magnitudes. The nearness can be generally called "co-locality."

Conversion of the Affinity Matrix to a Cost Matrix

Typically, techniques for finding a solution to a cost matrix are posed in terms of minimizing cost; however, the aim of a data layout optimization technique is to maximize affinity. Therefore, the following illustrated example calculates a cost matrix by subtracting each affinity from the maximum affinity plus one (this approach is known as additive reflection). Thus, the lowest cost in the matrix will be one. The cost matrix for class Bar calculated using additive reflection is shown in Table 14. An alternative would be to calculate reciprocals (e.g., 1/affinity) or rationalization about the least common multiple of the affinities.

TABLE 14

Cost Matrix for Class Bar

|  | $f_1$ | $f_2$ | $f_3$ | $f_4$ |
|---|---|---|---|---|
| $f_1$ | 110 | 12 | 0 | 74 |
| $f_2$ |  | 79 | 60 | 8 |
| $f_3$ |  |  | 97 | 0 |
| $f_4$ |  |  |  | 50 |

The cost matrix can be described as representing a graph. The graph uses self affinities as values for the vertices, and affinities between data members as the values for the edges. Affinities of zero are left as zero and represent absence of connection in the graph. Zero values can save on storage (i.e., under a sparseness technique) and provide other advantages, such as the ability to detect connected components of the graph.

Figure 15:
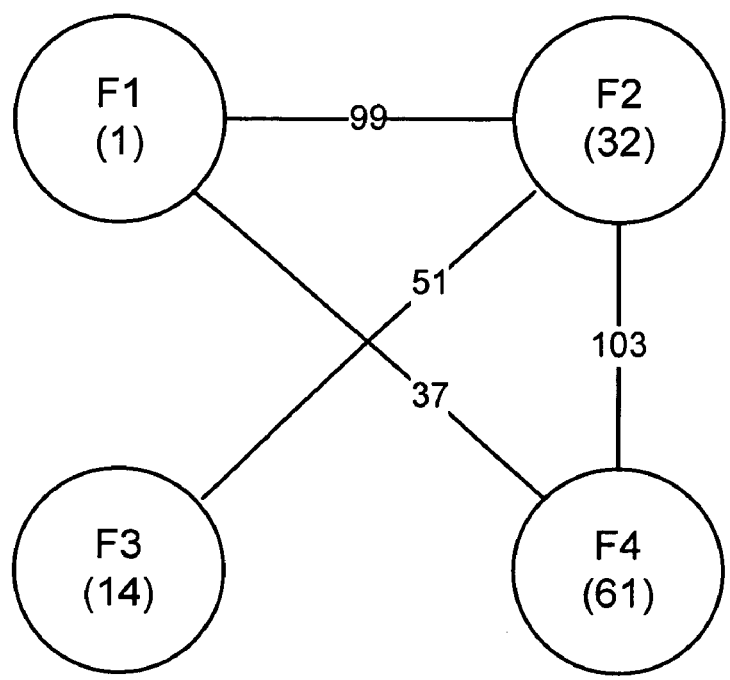
FIG. 15 is a graph representing a cost matrix calculated for class Bar.
Figure 16:
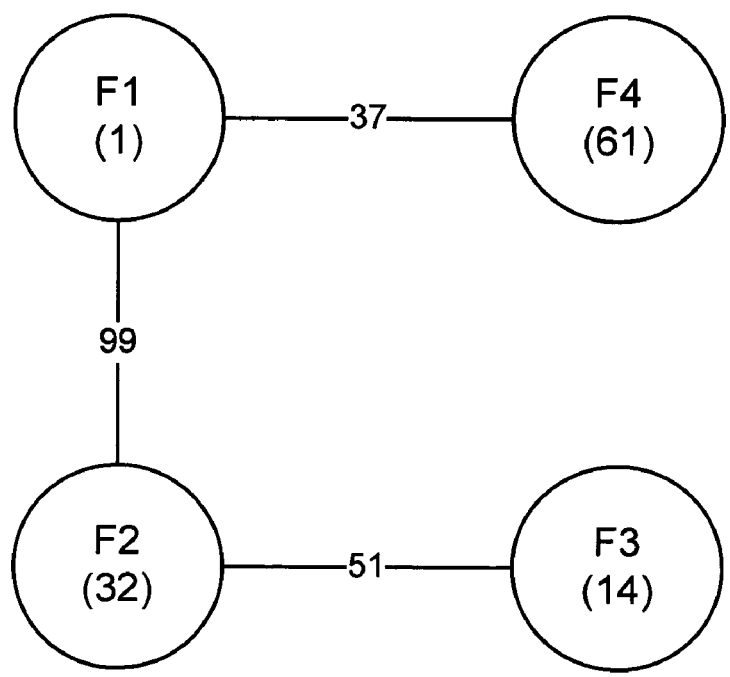
FIG. 16 is a minimum-cost spanning tree for the graph of FIG. 15.
Figure 17:
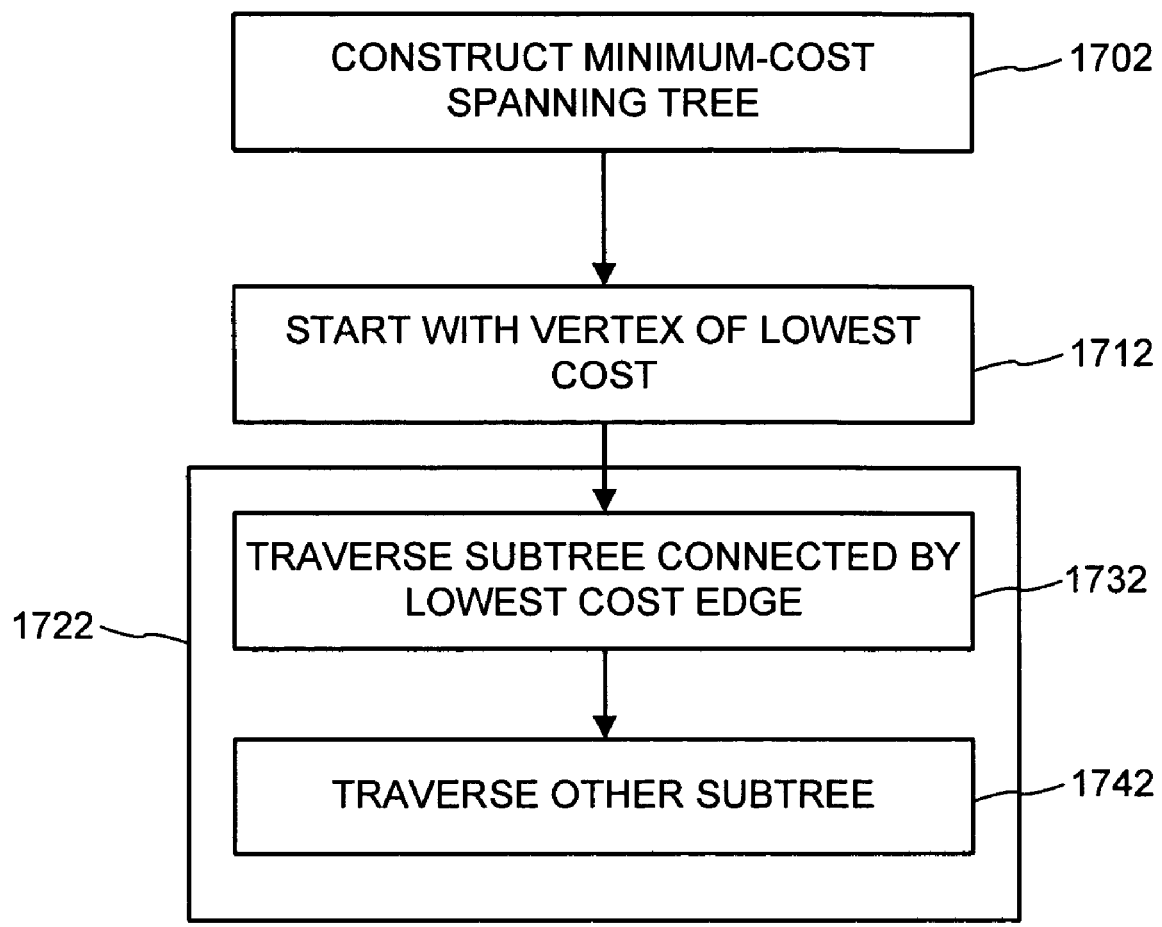
FIG. 17 is a flowchart showing a method for ordering data members, such as those shown in the graph of FIG. 15.

Accordingly, a graph representing the cost matrix of Table 14 is shown in FIG. 15, the minimum-cost spanning tree is shown in FIG. 16, and a method for ordering the data members is shown in FIG. 17.

The method of FIG. 17 uses a minimum-cost, depth-first approach (which degrades to a greedy approach under certain circumstances), although other approaches (e.g., minimum-cost, breadth first) may yield better performance in some instances. At 1702, a minimum-cost spanning tree is constructed from the graph representing the cost matrix (e.g., the graph shown in FIG. 15). Techniques for constructing a minimum-cost spanning tree include Kruskal's and Prim's algorithms. These algorithms have running times of O(E 1 g V) and O(E+V 1 g V), respectively (where E is the number of edges, and V is the number of vertices). The minimum-cost spanning tree of the graph shown in FIG. 15 is shown in FIG. 16.

The vertices are then traversed and the order of visitation recorded. At 1712, traversal begins with the vertex of lowest cost (e.g. $f_1$ in the tree shown in FIG. 16). The method then repetitively applies the technique 1722, which involves traversing the subtree connected by the lowest cost edge at 1732 (e.g., initially the edge connecting $f_1$ to $f_4$) according to the technique 1722 (e.g., recursively), then traversing the subtree connected by the other edge at 1742 according to the technique 1722. Such a traversal results in the ordering shown in Table 15. For purposes of example, an edge cost is also shown as a mechanism for deciding how to split the data members into groups.

TABLE 15

Data Member Ordering for Class Bar

| Data Member | Edge Cost |
|---|---|
| $f_1$ | |
| $f_4$ | 37 |
| $f_2$ | 99 |
| $f_3$ | 51 |

Splitting the data members can be done any number of ways, such as going through the ordering and choosing a cutoff when the edge cost exceeds an arbitrary cost threshold (e.g., the average edge cost of 62 ⅓). Under such an approach, the data members shown in Table 15 would be grouped into the following groups: Group 1 ($f_1$ and $f_4$) and Group 2 ($f_2$ and $f_3$). This approach can be extended to arrangements having more than two groups. For example, providing an additional group whenever the edge cost exceeds a specified threshold.

In some cases, there will be disconnected components of the graph. The data members can be grouped according to the disconnected components (e.g., data members in the same disconnected component are placed into the same group; data members in different disconnected components are placed into different groups). Additionally, more than one group can be used for a particular disconnected component if appropriate.

The affinity-based approach can be used in combination with various of the features described for the greedy approach, such as calculating averages (e.g., average edge cost), specifying an absolute value, or calculating standard deviations.

Declarative Layout Directives

To provide a software developer with further control over the data layout optimization process, declarative layout directives can be provided. For example, a developer can place a directive in source code to indicate that a particular class should not be optimized. In this way, the developer can explicitly opt out of the data layout optimization process for data members that, for example, may not function properly if rearranged or separated.

Display of Affinity Information

To provide a software developer with further information about affinities between data members, the affinity data can be displayed. For example, a graded color scheme shows the various data members as vertices in a graph, with colored lines according to the scheme (e.g., red represents a high affinity) connecting the vertices of the graph. Also, a graph (e.g., a pie chart) shows which data members are being referenced how often. Activating a part of the graph relating to a data member displays the data member's affinity with the other data members also in the form of a graph (e.g., another pie chart).

In this way, the developer is provided with information about the behavior of an object and can better craft a high-performance object set.

Inheritance

Supporting inheritance while grouping the data members poses some special problems. Generally, one way of solving these problems is to combine data concerning a parent class (including children of the parent class) and choose a single layout.

Static Fields

Static fields typically present a special case because there is only one value per class for a set of instances of the class. One alternative is to group static fields together or use different splitting thresholds for static fields.

Exemplary Command Line Options for Instrumentation and Grouping

As explained in the section on instrumentation, various options can be chosen when instrumenting code. Table 16 shows a possible command line scheme for specifying such options. Table 17 shows a possible command line scheme for a data member grouper for specifying options during the grouping process.

TABLE 16

Command line options for the instrumentor

| Example | Description |
|---|---|
| Instrument /TimeDriven:sampleRate Program.exe | Use a timer-based profile data collection technique; set the time to expire every sampleRate milliseconds |
| Instrument /MethodDriven Program.exe | Use a method-based profile data collection technique |
| Instrument /OverflowDriven Program.exe | Use an overflow-driven profile data collection technique (if supported) |

TABLE 17

Command line options for the Data Member Grouper

| Example | Description |
|---|---|
| DataOptimizer /greedy Program.exe | Use a simple greedy technique to order the data members |
| DataOptimizer /greedy /GlobalLinearThreshold: multiplesOfMean Program.exe | Use a greedy technique to order the data members, and split at the specified multiplesOfMean |
| DataOptimizer /greedy /GlobalAbsoluteThreshold:hitCounts Program.exe | Use a greedy technique to order the data members, and split at the specified hitCounts |
| DataOptimizer /greedy /GlobalGaussianThreshold: standardDeviations Program.exe | Use a greedy technique to order the data members, and split at the specified standardDeviations |
| DataOptimizer /affinity Program.exe | Use an affinity-based technique to order the data members |
| DataOptimizer /affinity /GlobalLinearThreshold: multiplesOfMean Program.exe | Use an affinity-based technique to order the data members, and split at the specified multiplesOfMean |

TABLE 17-continued

Command line options for the Data Member Grouper

| Example | Description |
| --- | --- |
| DataOptimizer /affinity /GlobalAbsoluteThreshold:hitCounts Program.exe | Use an affinity-based technique to order the data members, and split at the specified hitCounts |
| DataOptimizer /affinity /GlobalGaussianThreshold: standardDeviations Program.exe | Use an affinity-based technique to order the data members, and split at the specified standardDeviations |
| /ClassLinearThreshold:className, multiplesOfMean | A per-class threshold overriding the globally-specified option |
| /ClassAbsoluteThreshold: className, hitcounts | A per-class threshold overriding the globally-specified option |
| /ClassGaussianThreshold:className, standardDeviations | A per-class threshold overriding the globally-specified option |
| /splitOnly:className | splits only the class specified (may be specified zero or more times in the command line) |
| /splitOnly:* | split all classes |
| /globalQualification:x | Where x is H; HC; HCF, realNumber; or HCA, realNumber |
| /classQualification:x | Where x is H; HC; HCF, realNumber; or HCA, realNumber |
| /responseFile:filename | take options from fileName instead of the command line |

A wide variety of other techniques can be used to achieve similar control over the data layout optimization process, including a graphical user interface or a scripting language.

Dynamic Data Layout Optimization

Another way of achieving data layout optimization is to include profiling functionality in an execution engine. In this way, data member grouping is based on behavior of the object as observed in its actual environment, rather than a test environment. Data member grouping might therefore change over time, leading to dynamic data layout optimization.

Having described and illustrated the principles of our invention with reference to illustrated embodiments, it will be recognized that the illustrated embodiments can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa. Although reference is sometimes made to "an" object class or "a" data member, multiple object classes with a plurality of fields can be used. In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. One or more computer-readable media having computer-executable instructions for performing a method of splitting a class, the method comprising:

specifying at least one threshold corresponding to a certain number of memory references made to at least one of a plurality of data members of an object;

specifying a proposed cold group via the at least one threshold;

receiving an indication of a policy according to a policy framework supporting a plurality of options and configured to determine whether or not the class is to be split based at least on the proposed cold group, wherein the policy overrides a default policy by specifying the policy for a particular class, wherein the policy specifies at least one selected from the group consisting of: the class is split if the proposed cold group is bigger than a hot group overhead only, the class is split if the proposed cold group is bigger than a hot group overhead plus the proposed cold group overhead, and the class is split if the proposed cold group is bigger than a hot group overhead plus a fraction of the proposed cold group overhead;

assigning memory locations for data members for a hot group of the object within a first unit of memory in a virtual memory system;

assigning memory locations for data members for the proposed cold group of the object within a second unit of memory in the virtual memory system separately loadable into primary memory from the first unit; and splitting the plurality of data members of the object into at least the hot group and the proposed cold group based at least in part upon the at least one threshold and profile data corresponding to the plurality of data members of the object and responsive to determining that the policy indicates that the class is to be split.

2. The one or more computer-readable media of claim 1, further comprising using a threshold framework to allow for a plurality of ways to perform the specifying at least one threshold.

3. The one or more computer-readable media of claim 2, wherein one of the plurality of ways to perform the specifying at least one threshold comprises using an absolute threshold.

4. The one or more computer-readable media of claim 3, wherein the absolute threshold depends at least in part upon a total number of hits in a profiling run.

5. The one or more computer-readable media of claim 2, wherein one of the plurality of ways to perform the specifying at least one threshold comprises using a Gaussian threshold.

6. The one or more computer-readable media of claim 2, wherein one of the plurality of ways to perform the specifying at least one threshold comprises using a linear threshold.

\* \* \* \* \*